United States Patent

[11] 3,617,718

[72] Inventor Ernst H. Dummermuth
 East Cleveland, Ohio
[21] Appl. No. 841,846
[22] Filed July 15, 1969
[45] Patented Nov. 2, 1971
[73] Assignee Allen-Bradley Company
 Milwaukee, Wis.

[54] NUMERICAL CONTROL CONTOURING SYSTEM WHEREIN DESIRED VELOCITY INFORMATION IS ENTERED INTO THE SYSTEM INSTEAD OF FEEDRATE NUMBER
 23 Claims, 16 Drawing Figs.
[52] U.S. Cl..................................................235/151.11,
 318/571, 318/573
[51] Int. Cl..................................................G05b 19/18
[50] Field of Search..........................................235/151.11,
 151.11 I, 151, 151.1, 150.31, 152, 150.3; 318/568,
 569, 571, 573, 574

[56] References Cited
 UNITED STATES PATENTS
 3,122,691 2/1964 Centner et al. ............... 318/571
 3,191,111 6/1965 Greene........................ 318/571 UX
 3,286,085 11/1966 Rado........................... 318/571 X
 3,344,260 9/1967 Lukens........................ 318/571 X
 3,430,035 2/1969 Read........................... 318/571 X
 OTHER REFERENCES
 Henegar, " New Continuous Path System Uses DDA Interpolator," Control Engineering, Jan. 1961, pp. 71– 76.

*Primary Examiner*—Joseph F. Ruggiero
*Attorneys*—Arnold T. Ericsen and Richard C. Steinmetz, Jr.

ABSTRACT: A feedrate generator and a contour generator for a numerical control contouring system are provided wherein the velocity of the operation of the machine tool may be specified by a feedrate number (FRN) addressed with an identifying letter code or by velocity in inches per minute addressed with an identifying letter code. In both cases a normalization process is employed for increasing the operating speed of the system.

INVENTOR
ERNST H. DUMMERMUTH

Lindenberg + Freilich

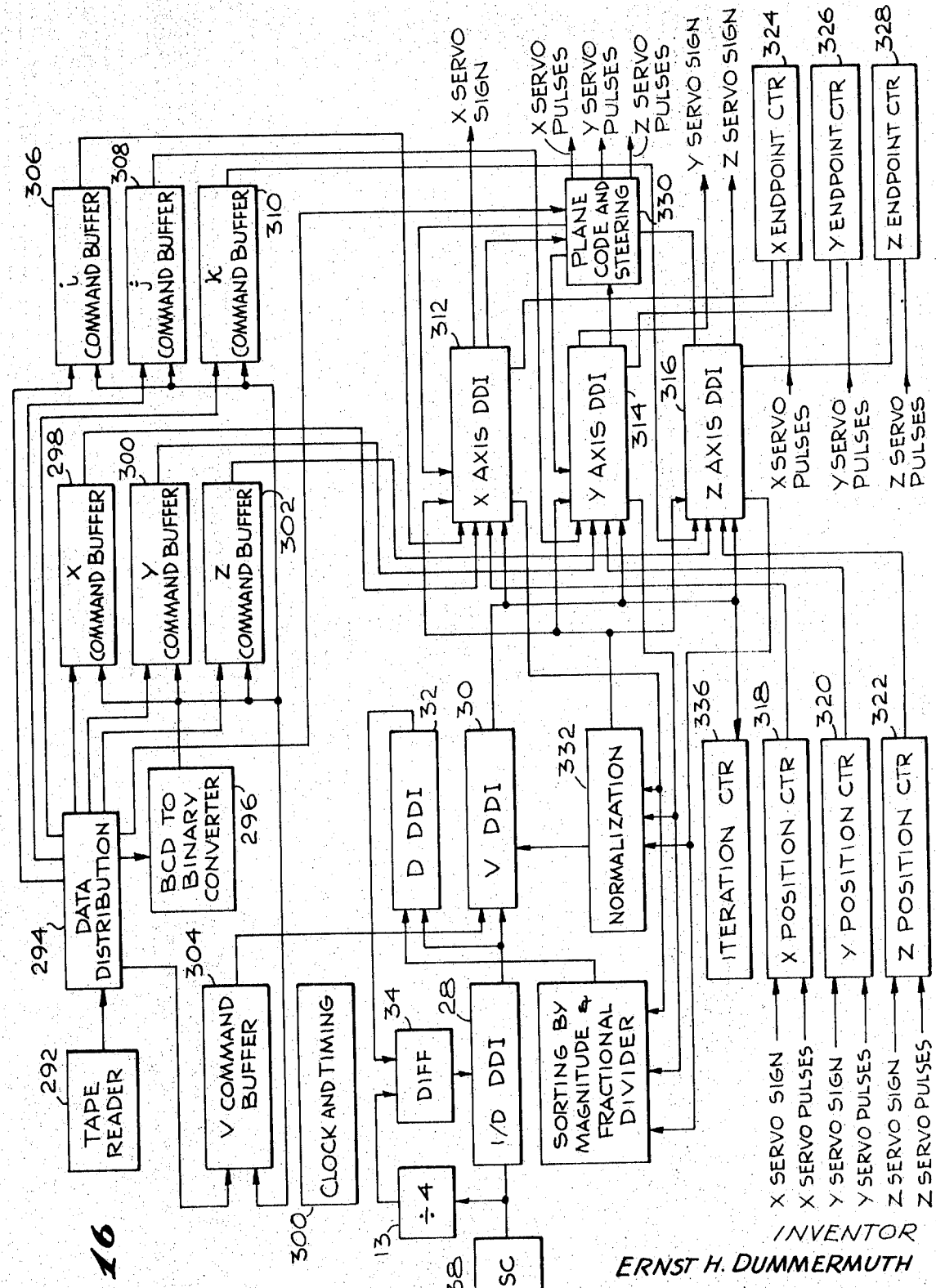

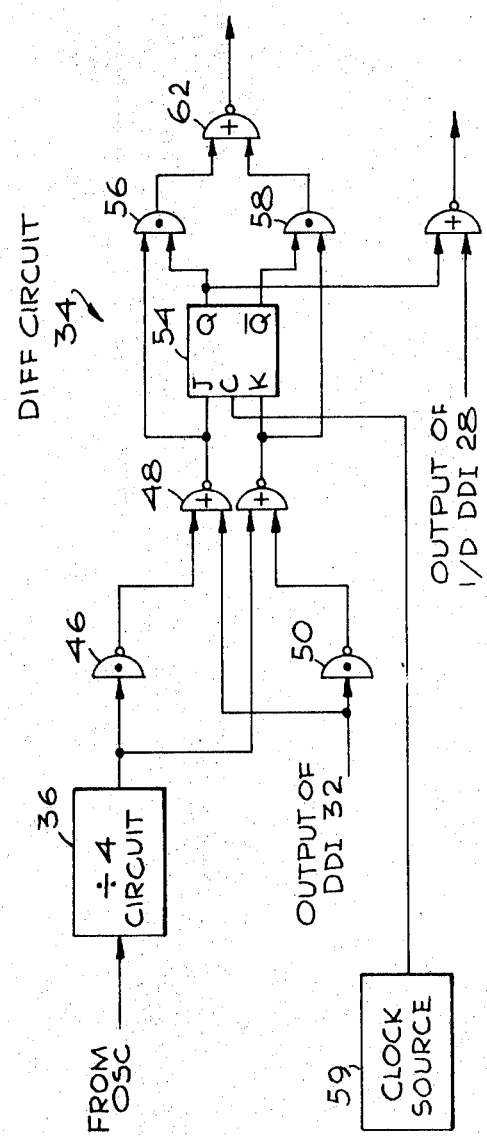
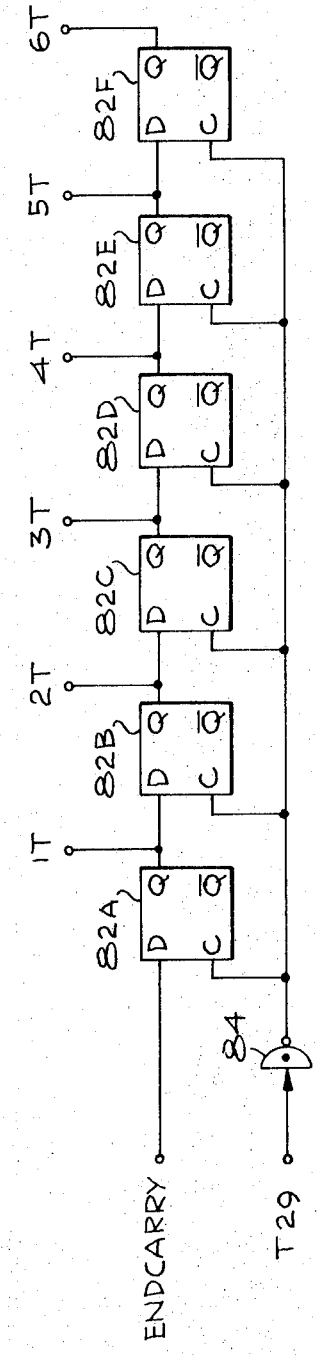
Fig. 6
Fig. 9

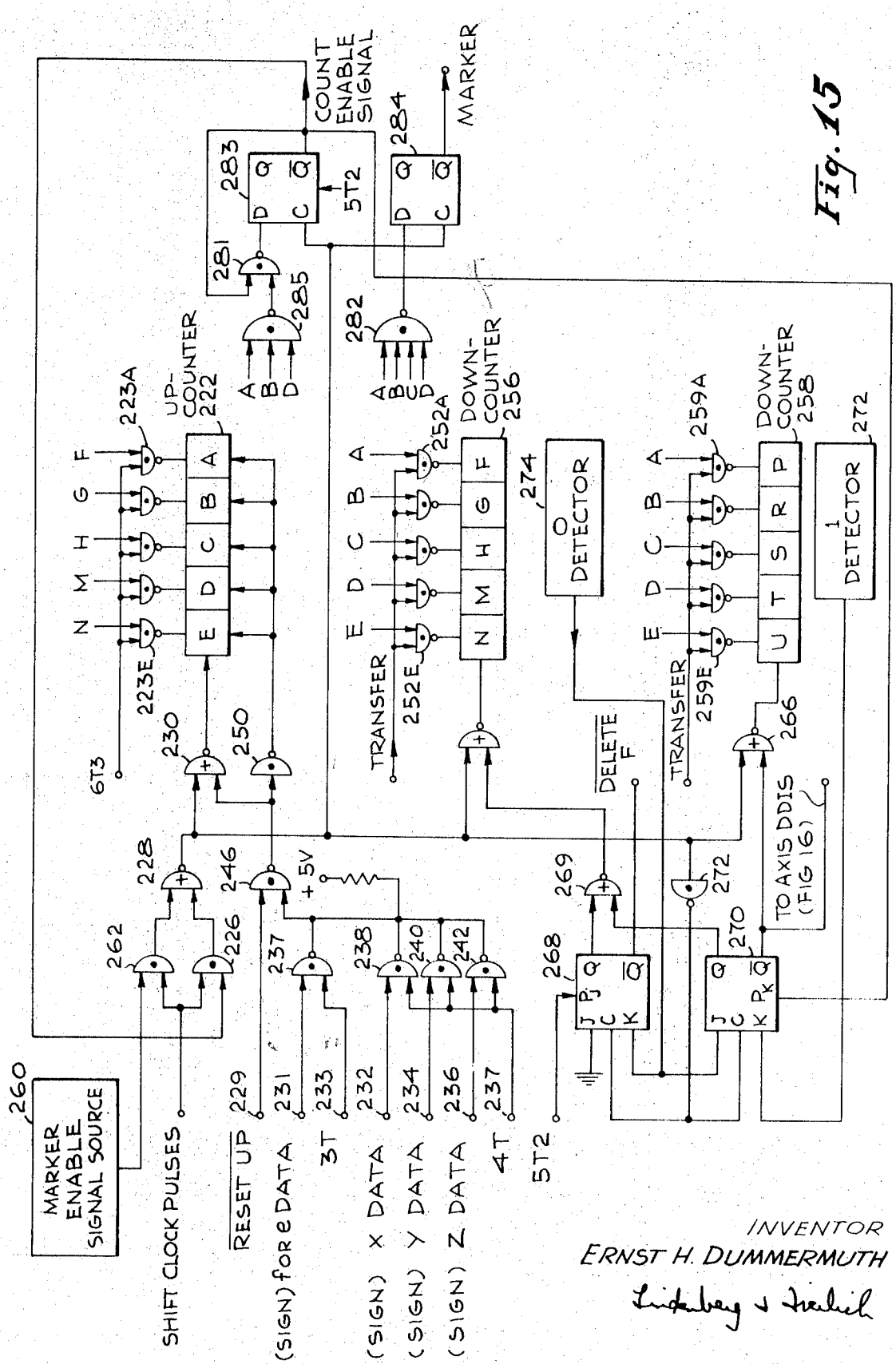

NUMERICAL CONTROL CONTOURING SYSTEM WHEREIN DESIRED VELOCITY INFORMATION IS ENTERED INTO THE SYSTEM INSTEAD OF FEEDRATE NUMBER

BACKGROUND OF THE INVENTION

This invention relates to numerical controlled machine tool systems, and more particularly to an improved feedrate computing and contour generating arrangement therefor.

In a numerically controlled machine tool, such as a numerical controlled contouring system, movement of the machine tool from one point to another is normally specified in three orthogonal components, X, Y and Z. When these components are applied to a three axis contour generator, then the velocity of each axis is proportional to the magnitude of its component and the input frequency to the contour generator.

In order that the machine tool maintain a constant path velocity for any choice of X, Y and Z, the input frequency to the contour generator must have the value of $f_c \cdot V/D$ where, $f_o$ is a constant frequency which is selected, V is the desired path velocity in inches per minute, and D is computed from X, Y and Z and has the value $D = \sqrt{X^2 + Y^2 + Z^2}$.

The fraction V/D is the term called the feedrate number, or FRN. For each set of axis commands X, Y and Z, the distance D is computed and thereafter for a selected velocity the FRN is computed. This number is entered into the control system together with the axis information.

OBJECTS AND SUMMARY OF THE INVENTION

A feature of this invention is to provide a numerical control system wherein the path velocity provided for any choice of X, Y or Z is maintained constant at the value of the velocity V which has been introduced into the system.

Another object of this invention is the provision of apparatus wherein a desired velocity V is entered into the system instead of an FRN number, and the system performs all of the necessary computations.

Another feature of the present invention is the provision of an arrangement for performing a process known as normalization, wherein leading zeros in distance axis command numbers, for example, are eliminated, resulting in a system which can operate at an increased speed.

This invention employs digital differential integrator circuits (hereinafter called DDI's) for generating pulse trains wherein the number of pulses in a train are equal to a binary number introduced into a register of the DDI, called the integrand, and the frequency of the pulse train is proportional to the product of the frequency $f_o$ of a clock signal applied to the DDI and a number in the DDI integrand.

A DDI is provided for each axis. The X, Y and Z information is introduced into each one of these DDI's. A process called normalization is then employed whereby the X, Y and Z binary numbers introduced into the integrands of the DDI's are all moved an equal number of places to the left in each one of these integrands to eliminate a specified number of the 0's preceding the most significant digit in the largest of the X, Y and Z binary numbers. Since the DDI's are effectively employed as rate multipliers, this automatically increases the frequency of the output pulse trains.

Structure is provided to compute the value of D from the normalized X, Y and Z numbers. Two DDI's are then provided, the first one driven by a clock oscillator, and the second one being driven by the output from the first one. The second DDI has the calculated value of D entered thereinto. The first DDI has the 1's complement of D entered thereinto, which is approximately the value 1/D. The output of the clock oscillator, which is applied to the input of the first DDI, is divided by 4 and this output is compared with the output from the 2nd DDI. If the two frequencies are different, then a binary digit is introduced into the integrand register of the first DDI to alter the frequency fed back from the second DDI until the comparison indicates that the frequencies are equal. The output of the first DDI, is then applied to drive a third DDI into which the binary number representing the desired velocity V has been entered. The output of this third DDI then drives the X, Y and Z DDI's whose outputs are applied to the machine tool control servo systems for the various axes.

The novel features of the invention are set forth with particularity in the appended claims. The invention will best be understood from the following description when read in conjunction with the accompanying drawings.

BRIEF DESCRIPTION OF THE DRAWINGS

FIG. 6 is a block diagram illustrating a difference circuit which may be used with this invention;

FIG. 9 is a block diagram of another timing generator employed herein;

FIG. 15 is a block schematic diagram illustrating circuits for automatically performing normalization and marker generation; and FIG. 16 is a block schematic diagram of a feedrate and contour generator, in accordance with this invention.

DESCRIPTION OF THE PREFERRED EMBODIMENTS

Figure 1:
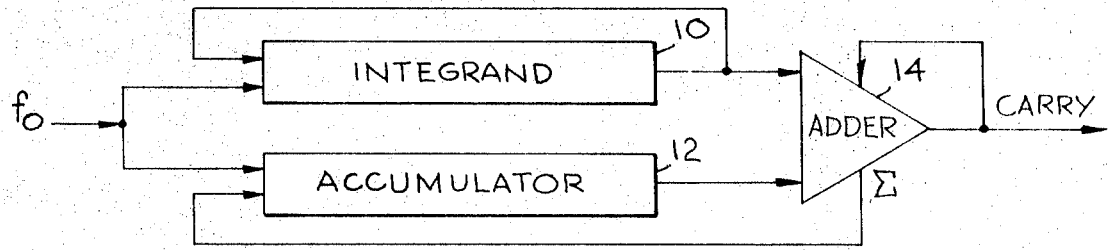
FIG. 1 is a block diagram of a digital differential integrator (DDI)

FIG. 1 shows a block diagram of a DDI. These are known circuits and have been described in the literature, such as in a book by Huskey and Korn entitled "Computer Handbook", published by the McGraw Hill Book Company in 1962, or in a Technical Memorandum of Massachusetts Institute of Technology entitled, "Requirements for a Curvalinear Interpolator Using Incremental Computation", published Sept. 1959 under Contract Number AF33(038)–24007 and referenced as 6873—TM–10, or in the book by T. R. H. Sizer entitled, "The Digital Differential Analyzer", published by Chapman and Hall Ltd. London 1968. The circuit is shown here for illustration purposes.

Two shift registers, respectively 10, 12 and a binary adder 14 are required to build a DDI. The shift register 10 is called the integrand; the shift register 12 is called the accumulator. Both shift registers are caused to shift their contents, least significant bits first, simultaneously into the adder 14 in response to a clock pulse designated as $f_0$. Initially, the integrand is loaded, Thereafter, for each circulating cycle (one $f_o$ pulse), the content of the integrand is added to the accumulator content. The integrand feeds its content back into itself in the course of a cycle, from its least significant bit position to its most significant bit position. The sum output of the adder is entered into the accumulator through the most significant bit position. Each time the accumulator overflows the DDI outputs one pulse. In order to obtain as many overflow pulses in a pulse train from a DDI as the value of the binary number in the integrand, there are required as many iteration cycles as there are binary bit places in the integrand. The frequency of the pulse train is the product of the input clock frequency $f_o$ times the number in the integrand expressed as a value less than 1.

The DDI is used here as a rate multiplier. For purposes of illustration hereinafter, and not by way of limitation upon the invention, assume that the registers used in the DDI are 26 bits long. Each iteration pulse ($f_o$) which is received initiates a burst of 26 shift pulses which is required to cause the integrand to recirculate its content and to add its content once to the accumulator. The maximum iteration frequency which is selected is 166.6 kHz. and therefore the time allowed for an iteration, or an arithmetic cycle is 6 microseconds. To accomplish the 26 shift pulses and to allow four additional clock times for data alignment, a total of 30 pulses have to be generated within a six microsecond iteration cycle. Therefore, the shift clock is selected to be 5 megahertz.

With the integrand fully loaded, (all bits set to 1) the accumulator overflows for every iteration pulse. Therefore the maximum output frequency equals the iteration rate 166.6 kHz.

By assigning negative powers of two to each bit position, the DDI will operate as a binary rate multiplier. For an example, assume that the number 110100 ....0 is entered into the integrand. Then $f_{out} = f_o \cdot (1 \cdot 2^{-1} + 1 \cdot 2^{-2} + 0 \cdot 2^{-3} + 1 \cdot 2^{-4} + ...) = f_o \cdot 0.8/25$.

Therefore, if the value in the integrand represents an incremental axis command X, then the output rate is proportional to the magnitude of X.

Figure 2:
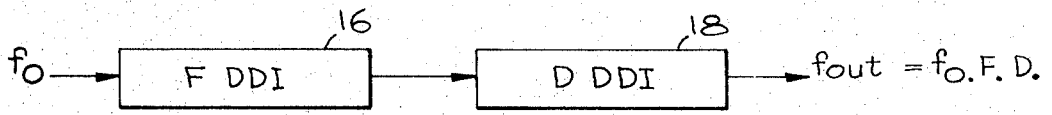
FIG. 2 represents two cascaded DDI's.

FIG. 2 represents two DDI's respectively 16 and 18 which are cascaded. The overflow of the first DDI 16 is the iteration clock for the second DDI 18. The output frequency $f_{out} = f_o \cdot F \cdot D$. The DDI's operate just like rate multipliers and the multiplication is determined by the values of the integrand F and D.

Figure 3:
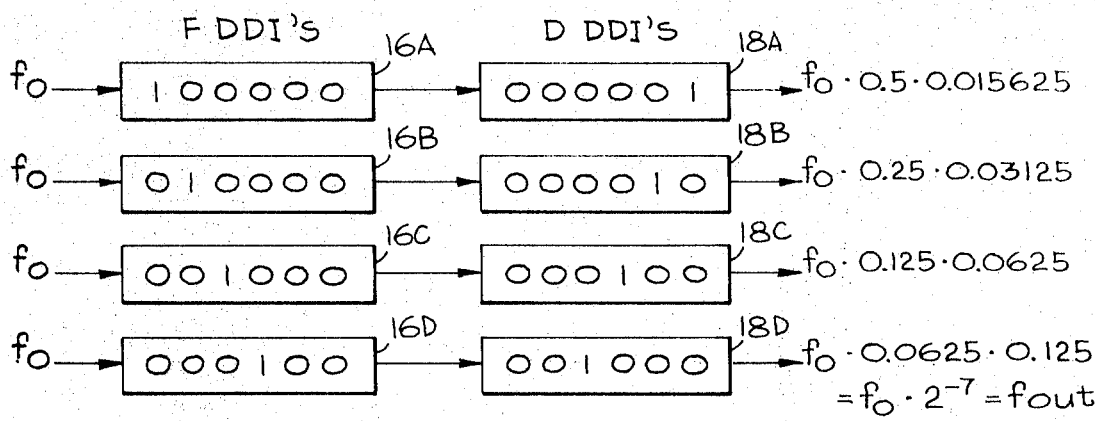
FIG. 3 represents cascaded DDI's illustrating constant frequency output.
Figure 4:
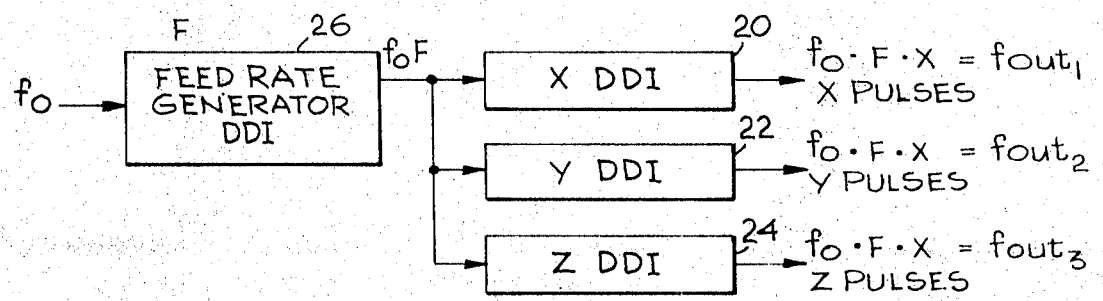
FIG. 4 represents a three axis system for a contour generator, in accordance with this invention.

Normalization for a System Programmed with FRN = V/D (FIGS. 2, 3 and 4)

If the D DDI in FIG. 2 is loaded with various values of incremental commands, and the output frequency is to remain constant for every incremental command, then a number F has to be inserted into the F DDI which balances the variations of D. If F is selected to be proportional to $1/D$ (inverse time concept) then $f_{out} = f_o \cdot C \cdot (1/D) \cdot D$ in which case the output frequency is equal to the constant $f_o \cdot C$. The frequency $f_{out}$ is much lower than $f_o$, since the D and F DDI's reduce the input frequency by having values less than 1. C is a constant called a reduction factor. Its derivation will be shown later herein.

Referring now to FIG. 3, there may be seen four illustrations of how to obtain a constant frequency output with four different values being entered into the D DDI. Assume for the sake of this illustration that the shift registers used in the DDI's have only a 6-bit capacity. Then, as shown in FIG. 3, when the shift register 18A only has a 1 in the least significant bit position, the shift register 16A will have a 1 in the most significant bit position and the output frequency will be the product $f_o \cdot 0.5 \cdot 0.015625$. The entry of the number 000010 in register 18B calls for the number 010000 in register 16B, in response to which the output frequency will be the same as that derived from DDI's 16A and 18A.

The entry of 000100 in register 18C requires the entry of a number 001000 in the register of the DDI 16C. The entry of a number 001000 in the register of DDI 19D requires the entry of a number 000100 in the register of DDI 16D. If the multiplications indicated are all carried out, it will be seen that the product is the same for each set of cascaded DDI's so that the input frequency is equal to $f_o \cdot 2^{17}$.

Studying FIG. 3 it may be observed that with a 6-bit register there is a drop of a factor $2^{17}$ in frequency from input to output. Using a 25-bit register causes a drop of a factor of $2^{126}$ from input to output. This of course reduces the output rate such that it is no longer useful. However, it also may be observed from FIG. 3 that if D increases F decreases and that there are always a total of five leading 0's in the two registers. This yields a conclusion that the reduction factor C can be substantially increased by removing these leading 0's.

In other words, the contents of F and D may be shifted to the left until these 0's are removed. Shifting left means a multiplication by 2. Using this technique for eliminating the five leading 0's a gain $2^5$ in output frequencies is obtained. If the largest F number possible (all 1's) is used with the smallest D number, there is an additional factor of 2. The total improvement is $2^6$.

Therefore, the reduction factor C can be made $C=0.5$ and so that the output frequency becomes $f_{out}=0.5 \cdot f_o$. The maximum output frequency of the cascaded DDI's is then $f_{out}=166.6$ kHz. $\cdot 0.5 = 83.3$ kHz. for any value placed in the D DDI.

The same principle may be applied to a 25-bit register. Considering the largest possible number in one of the registers either D or F, combined with the smallest possible number in the other of the registers (either D or F), then it may be seen that there will always be 24 leading 0's in the combination of the registers of the two cascaded DDI's where it is desired that the output frequency be maintained constant, regardless of the value of the number entered into the D register of the two cascaded DDI's.

If 24 leading 0's are removed, then the maximum output frequency again is $f_{out}=f_o \times 0.5$. This process of removing a constant number of leading 0's is called normalization and works for any length of registers.

The normalization procedure for obtaining a constant $f_{out}$ is as follows. The number of leading 0's in the register of the F DDI is counted. These 0's are effectively removed by disabling the same amount of shift pulses into the F register. Thereafter, leading 0'0'are removed from the D register such that the total amount of 0's which are removed equals 24.

In most cases there are more than 24 leading 0's available. If only a fraction of the maximum output frequency (83.3 kHz.) is desired, then F is programmed smaller and D remains unchanged. This may be expressed by the equation $F=V/D$, where V is a desired velocity. Entering D minimum and V maximum into this equation, one can compute F maximum and, by assigning weights to the bit positions in the F register, one can make this number fit into the 25-bit register length.

Allowing the number D which is entered into the register of the D DDI to stand for distance, then, in a one axis machine, $D=X$. Similarly, the number F entered into the F DDI represents the feedrate number. In a multiple axis machine such as a three axis machine, the D DDI is replaced by a parallel operation of three axis DDI's. That is, an X DDI 20, a Y DDI 22 and a Z DDI 24, such as is shown in the contour generator of FIG. 4. These X, Y and Z DDI's 20, 22 and 24 are all driven in parallel from an F DDI 26. The value of the distance D is equal to $\sqrt{X^2+Y^2+Z^2}$, and is not entered into any register. It serves only in computing the feedrate number F.

The values of X, Y and Z are entered into their respective DDI registers in FIG. 4 and the value of D is computed. The required value of F is then computed from the value of D using the principles indicated in the description of FIG. 3. As a result, the velocity V of the numerically controlled machine tool, which is driven in response to the X, Y and Z pulses provided by the outputs $f_{out1}, f_{out2}$ and $f_{out3}$ from the respective X, Y and Z DDI's respectively 20, 22 and 24, will be maintained constant along the path vector. An arrangement for performing this operation will be described in detail subsequently herein.

Figure 5:
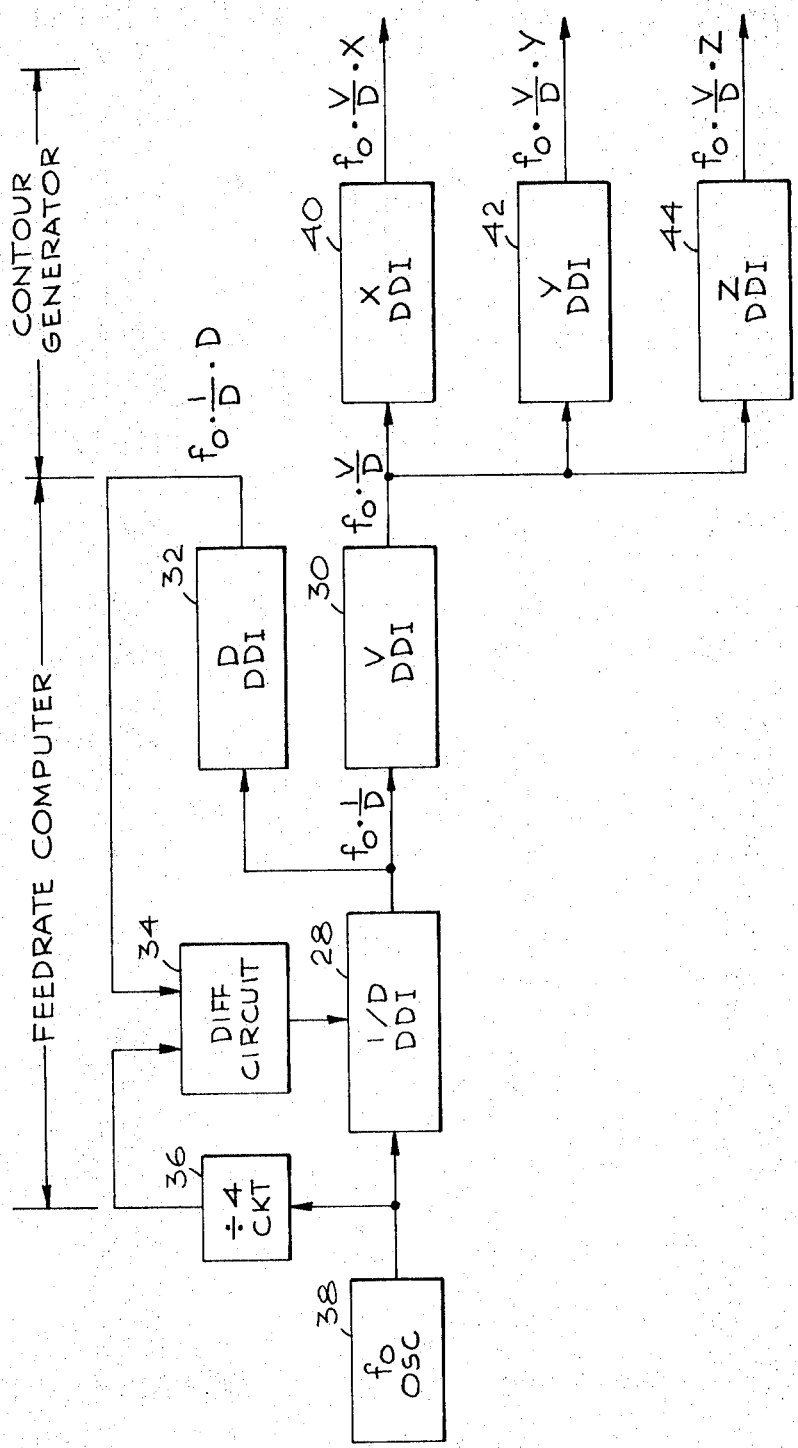
FIG. 5 is a block diagram illustrating a feedrate computer operating with a contour generator in accordance with this invention.

Feedrate Computing Concept and Normalization (FIG. 5)

FIG. 5 is a block diagram illustrating a feedrate computer and contour generator operating in accordance with the basic feedrate computing concept of this invention. It is known that the feedrate number F equals V/D, where V is the velocity desired and D is the distance commanded. Accordingly, the feedrate generator 26 in FIG. 4 may be replaced by two cascaded DDI's 28 and 30 in FIG. 5. The first of these will have the value 1/D inserted into its register and the second of these will have the value V inserted into its register. Accordingly, the output from the DDI 30 should be $f_o \cdot (1/D) \cdot V = f_o (V/D)$.

The output of the 1/D DDI is also applied to a D DDI 32. The output of the D DDI is applied to a difference circuit 34. The other input to the difference circuit 34 is the output of a 4 circuit 36, whose input is driven by an oscillator 38. Normalization for the feedrate computing mode is different than that for the FRN mode. The X, Y and Z binary numbers introduced into the integrands of the DDI's are all moved an equal number of places to the left in each one of these integrands to eliminate all but one of the 0's preceding the most significant digit in the largest of the X, Y and Z binary numbers. Again, using the example of a register containing 25 data bits, the output frequency of the axis DDI's has a range of $\approx 10^7:1$, normalized; however, the output frequency varies per axis by a factor of 2:1 only.

Now assume that the value of D has been calculated from the normalized integrand as $D = \sqrt{X^2 + Y^2 + Z^2}$ and is placed into the DDI 32. The 1's complement of the normalized $D$ is now inserted into the 1/D DDI 28 as an initial approximation. The oscillator 38 is then permitted to apply pulses to both the 4 circuit 36 and the DDI 28. The output of the DDI 28 drives the DDI32 whose output is applied to the difference circuit 34. The difference circuit 34 compares the two inputs and either increments or decrements the value in the DDI 28 until the frequency of its two inputs are made equal. Effectively the arrangement is a form of a servo loop which drives the value in the DDI 28 to equal 1/D so that the output of the D DDI 32 equals $f_o/4$.

It will be appreciated that the 4 value is picked as an exemplary value. Any other suitable constant divisor may be selected. The value 1/D is converged upon very rapidly by the DDI 28. The rate at which it converges is determined by the accuracy of the initial approximation and the size of the increments.

The output of the DDI 28 drives the DDI 30 into which the desired velocity for the operation of the system has been entered. Thus, the frequency which is applied to the three axis DDI's respectively 40, 42 and 44 has the value $f_o \cdot V/D$. The vectorial velocity of the machine tool along the predetermined path will have the value V no matter what the magnitudes of X, Y, and Z, since the axis DDI's multiply $f_o \cdot V/D$ by a factor $D$. Therefore, the output frequency $f_{out}$ becomes independent of $D$.

Difference Circuit (FIG. 6)

FIG. 6 is a block diagram illustrating details of the difference circuit 34 in FIG. 5. The output of the 4 circuit 36 is applied to an inverter 46 and to a NOR-gate 52. The output of the $D$ DDI 32 is applied as an input to the NOR-gate 48 and to an inverter 50. The outputs of the inverters 46 and 50 are applied to NOR-gate 48 and 52 respectively.

NOR-gate 48 applies its output to the J input terminal of JK flip-flop 54, and also to an AND-gate 56. The output of NOR-gate 52 is applied to the K terminal of the flip-flop 54 and also to an AND-gate 58. The pulses from a clock source 59 are applied to the clock input terminal C of the flip-flop 54.

The $\overline{Q}$ output of flip-flop 54 is applied to AND-gate 58 and also to a NOR-gate 60. The Q output of flip-flop 54 is applied to the AND-gate 56. The outputs of AND-gates 56 and 58 are applied to a NOR-gate 62. The output of NOR-gate 62 constitutes a pulse signal indicative of the presence of a difference between the two input frequencies and the output of NOR-gate 60 is indicative of the sign of that difference. A second input to NOR-gate 60 is an output from the 1/D DDI register 28 to force the output of gate 60 low (subtract mode) if the 1/D DDI is about to overflow.

The operation of the difference circuit 34 of FIG. 6 is as follows. If a pulse appears at the output of the 4 circuit 36 when no pulse is present at the output of the D DDI 32, then the output of the NOR-gate 48 is high which causes the flip-flop 54 to be driven by the clock source 59 to the state wherein the Q output is high. This enables AND-gate 56 to apply a pulse to NOR-gate 62 which provides an output. Also, NOR-GATE 60 provides an output indicative of the fact that the pulse should be added to the number in the 1/D register.

If an output is present from the $D$ DDI 32, and a pulse is present from the 4 circuit 36, then the outputs of both NOR-gates 48 and 52 are low and there will be no change in the state of the flip-flop 54, nor will there be any output from the NOR-gate 62. There will be no change in the content of the 1/D DDI register 28.

If a pulse is present at the output of the $D$ DDI 32 and none is present at the output of the 4 circuit 36, then the output of NOR-gate 52 is high, and flip-flop 54 will be driven to its state for which its $\overline{Q}$ output is high. This will result in an output from AND-gate 58, whereby an output pulse is obtained from NOR-gate 62. Since the $\overline{Q}$ output of flip-flop 54 is high, the output of NOR-gate 60 goes high and a 1 is subtracted from the number in the 1/D DDI register in response to the output from the NOR-gate 62. Thus, the 1/D DDI 28 rapidly converges upon the 1/D value in its register.

Clock and Timing Diagrams (FIGS. 7–12)

The particular circuits which are employed in the exemplary embodiment of the invention being considered herein both already described and to be described require clock and timing pulses in order to function. Accordingly, the circuits whereby these clock and timing pulses are generated will now be described.

Figure 7:
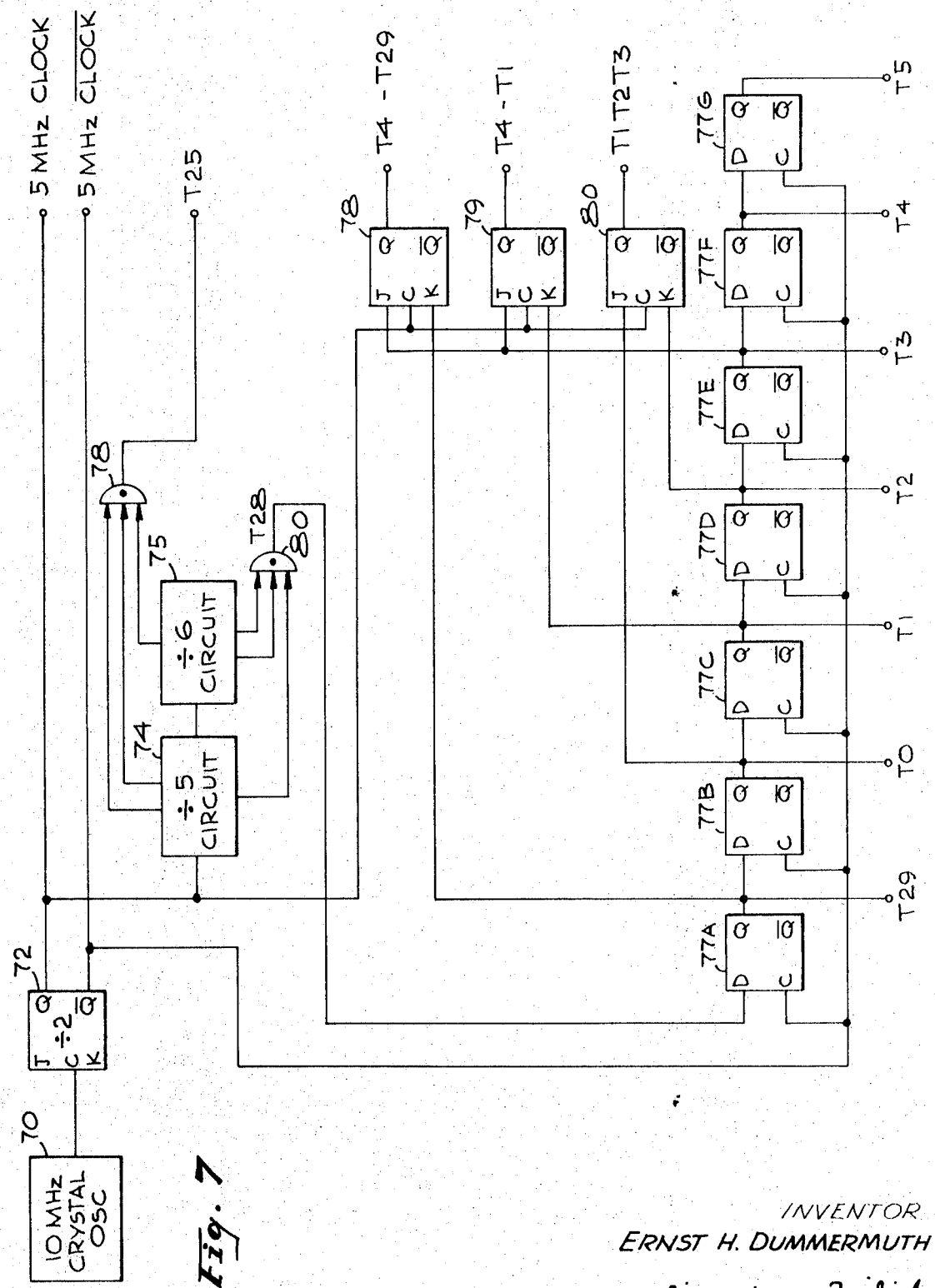
FIG. 7 is a block diagram of a timing generator employed with this invention.
Figure 8:
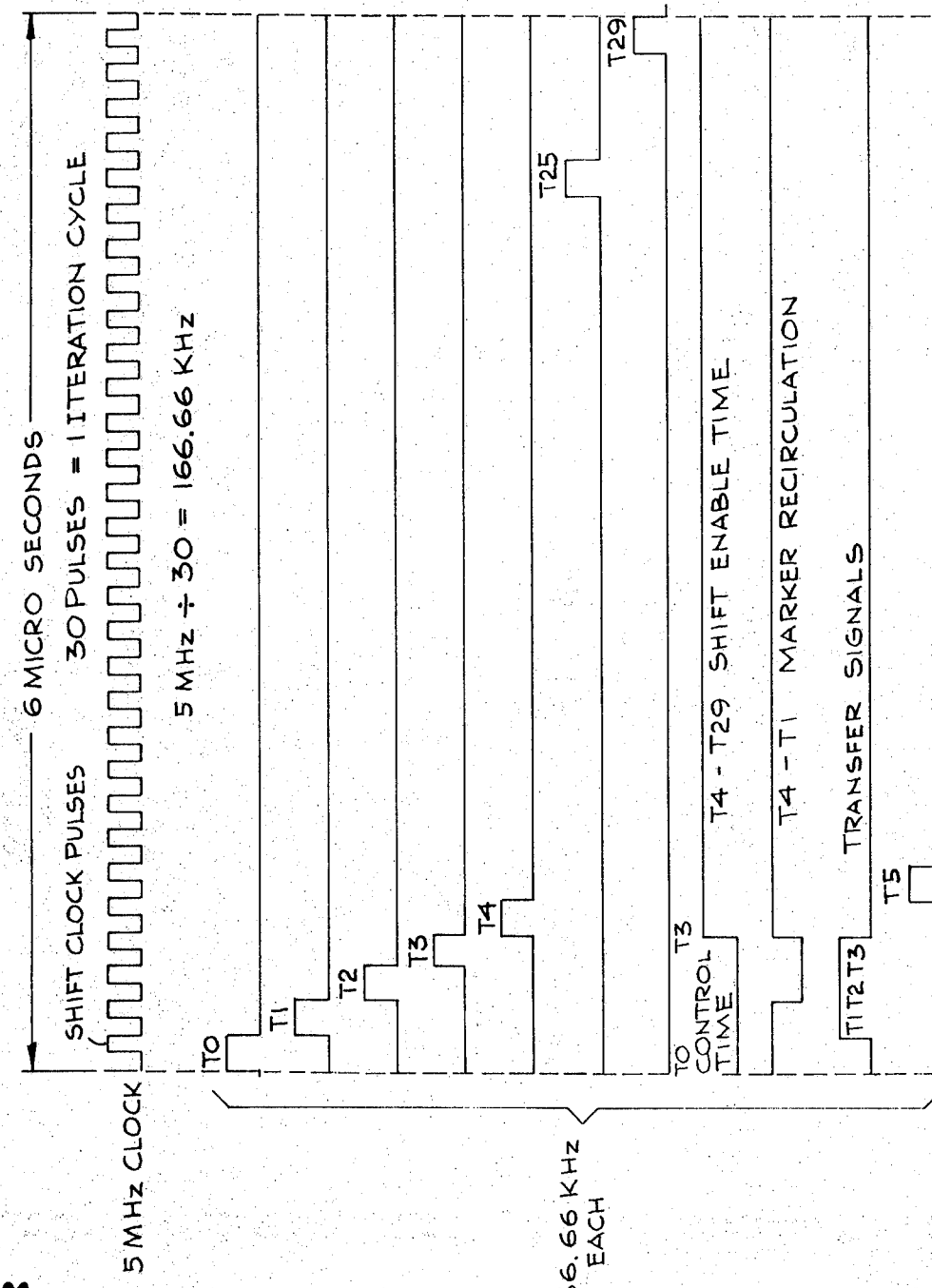
FIG. 8 is a diagram illustrating the timing of the signals generated by the block diagram represented by FIG. 7.

FIG. 7 is a block schematic diagram of a timing generator, and FIG. 8 is a waveform diagram illustrating the various timing pulses generated by the arrangement shown in FIG. 7.

By way of illustration and not to be construed as a limitation upon the invention, the basic oscillator which times the operation of the system is exemplified in FIG. 7 by a 10 MHz crystal oscillator 70, whose output frequency is divided in half by a flip-flop 72. The Q output of the flip-flop is designated as 5 MHz clock, and the $\overline{Q}$ output of the flip-flop is designated as 5 MHz clock.

The Q output of flip-flop 72 is connected to a 5 circuit 74, whose output drives a 6 circuit 75. The total resultant division therefore, is 30. The 5 and 6 circuits 74 and 75 may typically be counters which are driven in the manner represented in FIG. 7.

An AND-gate 78 produces an output in response to the 25th count derived from the 5 and 6 circuits 74 and 75. Its output is designated as clock pulse T25. An AND-gate 80 derives the 28th count of the 5 and 6 circuits 74 and 75. Its output is designated as clock pulse T28.

The clock pulse T28 from AND-gate 80 is applied to the D input of the first flip-flop stage 77A of a shift register composed of seven stages respectively 77A through 77G. The application of the clock pulse T28 to the D input of flip-flop 77A qualifies the input so that, upon the next $\overline{Q}$ output from flip-flop 72, flip-flop 77A is set with its Q output high, representing a 1 output which is designated as clock pulse T29.

The Q output of each of the stages 77A through 77F is connected to the D input of the next succeeding shift register stage. Accordingly in the presence of a clock pulse, if the preceding stage Q output is high, there is a transfer of the 1.

It will thus be understood that the clock pulse T28 qualifies the register stage 77A, the next clock pulse T29 sets the register stage 77A, and the next following pulse, which is designated at T0, causes a transfer of the one from stage 77A to stage 77B. This operation continues until the last stage 77G is set producing a Q output designated as clock pulse T5. Upon the occurrence of the next clock pulse, which is designated as T6, the register is cleared.

The 5 MHz output from the flip-flop 72 is applied to the clock inputs of three flip-flops respectively 76, 79 and 81. The J input to flip-flops 76 and 79 is clock pulse T3. The K input to flip-flop 76 is clock pulse T29. The K input to flip-flop 79 is clock pulse T1. The J input to flip-flop 81 is T0. The K input to flip-flop 81 is $\overline{T3}$. As a result, the Q output of the flip-flop 76 is a long pulse which extends from clock times T4–T29 and is employed to establish a shift enable time. The output of flip-flop 79 extends from clock pulses T4–T1, that is, from clock pulse T4 until the occurrence of the next occurring T1 clock pulse, and is employed for marker recirculation. The Q output of the flip-flop 81 is used for the transfer of normal counters in the system and is designated as T1T2T3, because it extends over the interval of these three clock pulses.

On the assumption that all of the registers which are employed herein, including those in the DDI's, have a 26-bit capability, 25 of these bits are data storage bits and one extra bit, which is to the right of the least significant bit position, is used for synchronizing purposes only. The leading bit, or bit in a register on the left side is reserved for sign information. The registers are continuously cycled in response to 30 clock pulses, as shown on the top of the timing chart of FIG. 8, and these are designated as shift clock pulses. They occur at a 5 MHz rate and constitute an iteration cycle for the DDI's. The first four of these clock pulses designated T0, T1, T2, and T3, are reserved as control times for data alignment, or in performing other operations, the T0–T3 time being designated in FIG. 8 as control time. This leaves the time period constituted by the clock pulses T4–T29 in FIG. 8 as the shift enable time referred to previously, which has a duration of 26 shift clock pulses. FIG. 8 also illustrates the marker recirculation pulse time T4–T1 which occurs over an interval of 28 clock pulses, the transfer pulse T1T2T3 occurring over an interval of three shift clock pulses, and each of clock pulses T0–T5, T25 and T29. It will be understood that the clock source 59 in FIG. 6 actually constitutes T5 clock pulses.

FIG. 9 is a block schematic diagram illustrating a timing generator which is used as an end carry delay chain in the exemplary embodiment being described herein. Assume that a DDI is just processing a set of data and a new set of data to be processed has been entered into a buffer. As soon as the data in the DDI is completely processed (which may be indicated by using an overflow of an iteration counter which counts iteration pulses), the overflow pulse is applied to the D input of the first flip-flop 82A of a shift register containing six shift register stages respectively 82A through 82F. The shift clock for the register comprises T29 clock pulses, which are applied through an inverter 84 to all the clock inputs C of the stages 82A–82F shift register.

Figure 10:
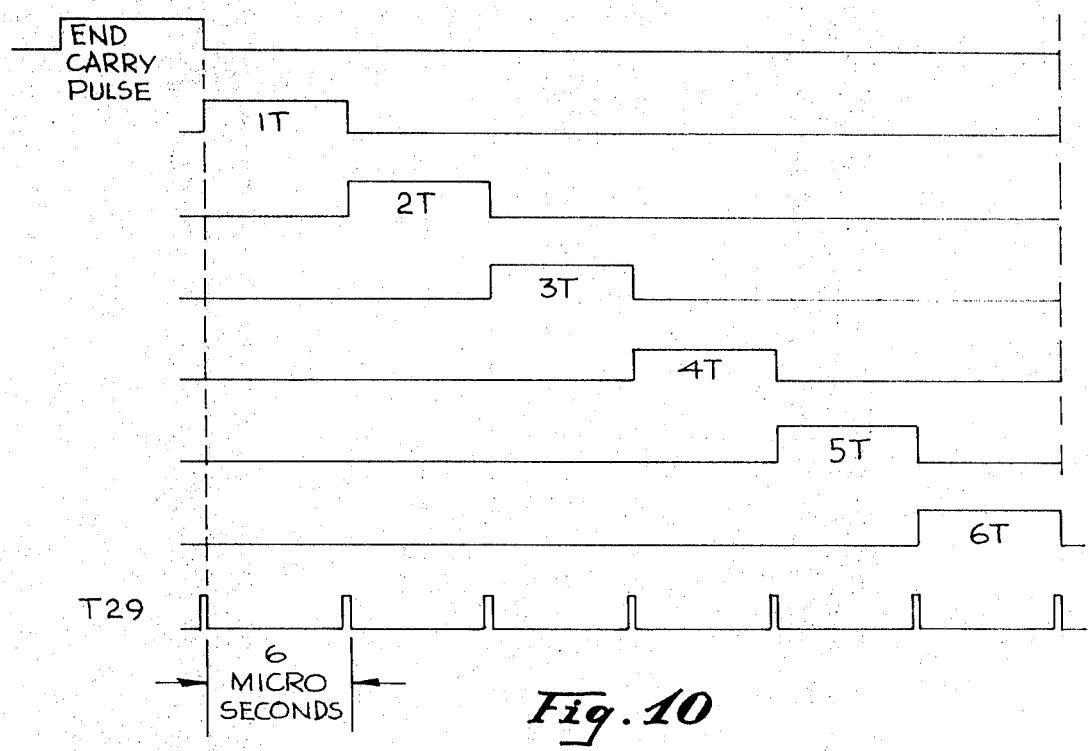
FIG. 10 is a chart illustrating the timing of pulses derived from the block diagram of FIG. 9.
Figure 12:
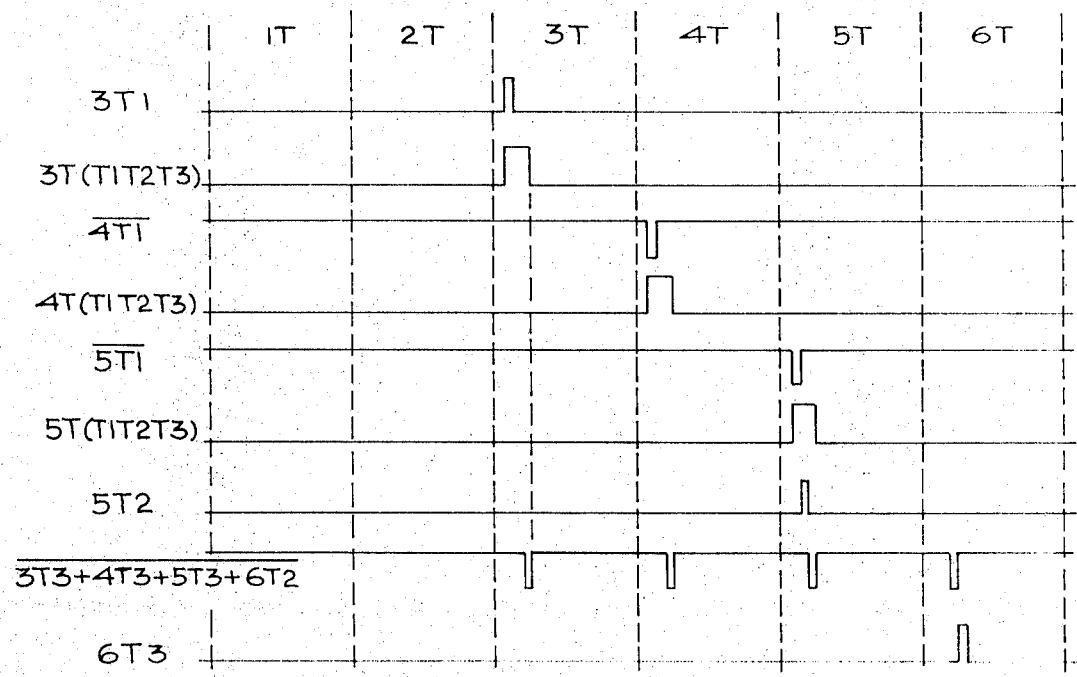
FIG. 12 is a timing chart illustrating the signals obtained using the logic of FIG. 11.

Accordingly, after the occurrence of the overflow of the iteration counter in response to successive T29 clock pulses, the 1 state in the first stage 82A of the shift register is successively shifted through all of the succeeding stages 82B–82F of the shift register. The outputs derived from each stage are respectively designated as 1T through 6T, and the waveform diagram or timing chart illustrating their occurrence is shown in FIG. 10. As indicated in FIG. 10, these pulses have a pulse width of 6 microseconds and successively occur after the end carry pulse. The functions that are performed in response to the occurrence of these pulses will be described in connection with the system description provided later herein.

Figure 11:
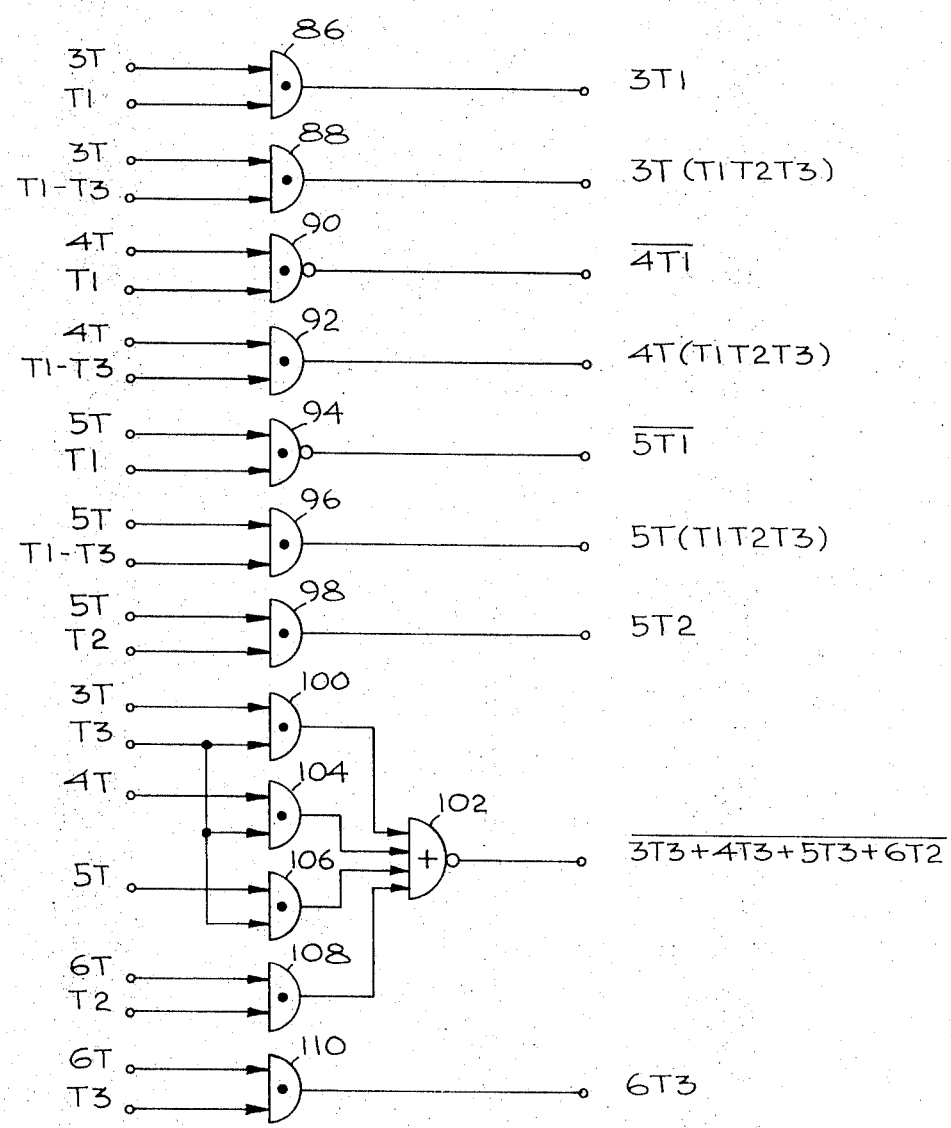
FIG. 11 is a timing decoding matrix.

FIG. 11 represents a schematic diagram of another timing generator which is employed as a timing decoding matrix. It constitutes logic gates for combining pulses from the circuits previously shown to obtain special timing signals as illustrated in the timing chart of FIG. 12. More specifically, with reference to FIG. 11, an AND-gate 86 combines a 3T pulse and a T1 pulse to provide a 3T1 output signal; an AND-gate 88 combines a 3T pulse and a T1–T3 pulse to provide an output designated as 3T (T1T2T3); a NAND-gate 90 combines a 4T and a T1 pulse to provide a signal designated as $\overline{4T1}$; an AND-gate 92 combines a 4T pulse and a T1–T3 pulse to provide an output signal designated as 4T (T1T2T3); a NAND-gate 94 combines a 5T pulse and a T1 pulse to provide an output signal designated as $\overline{5T1}$; an AND-gate 96 combines a 5T pulse and a T1T2T3 pulse to provide an output signal designated as 5T (T1T2T3); and an AND-gate 98 combines a 5T pulse and a T2 pulse to provide an output designated as 5T2.

Still with reference to FIG. 11, an AND-gate 100 has a 3T pulse and a T3 pulse applied thereto with its output being applied to a NOR-gate 102; a second AND-gate 104 has a 4T pulse and a T3 pulse applied thereto with its output also being applied to the NOR-gate 102; a third AND-gate 106 has a 5T pulse and a T3 pulse applied thereto with its output also being applied to the NOR-gate 102; and a fourth AND-gate 108 has a 6T pulse and a T2 pulse applied thereto with its output also being applied to the NOR-gate 102. The resulting output of the NOR-gate 102 may accordingly be designated as $\overline{3T3+4T3+5T3+6T2}$.

The remaining AND-gate 110 combines a 6T pulse and a T3 pulse to provide an output signal designated at 6T3.

Figure 13:
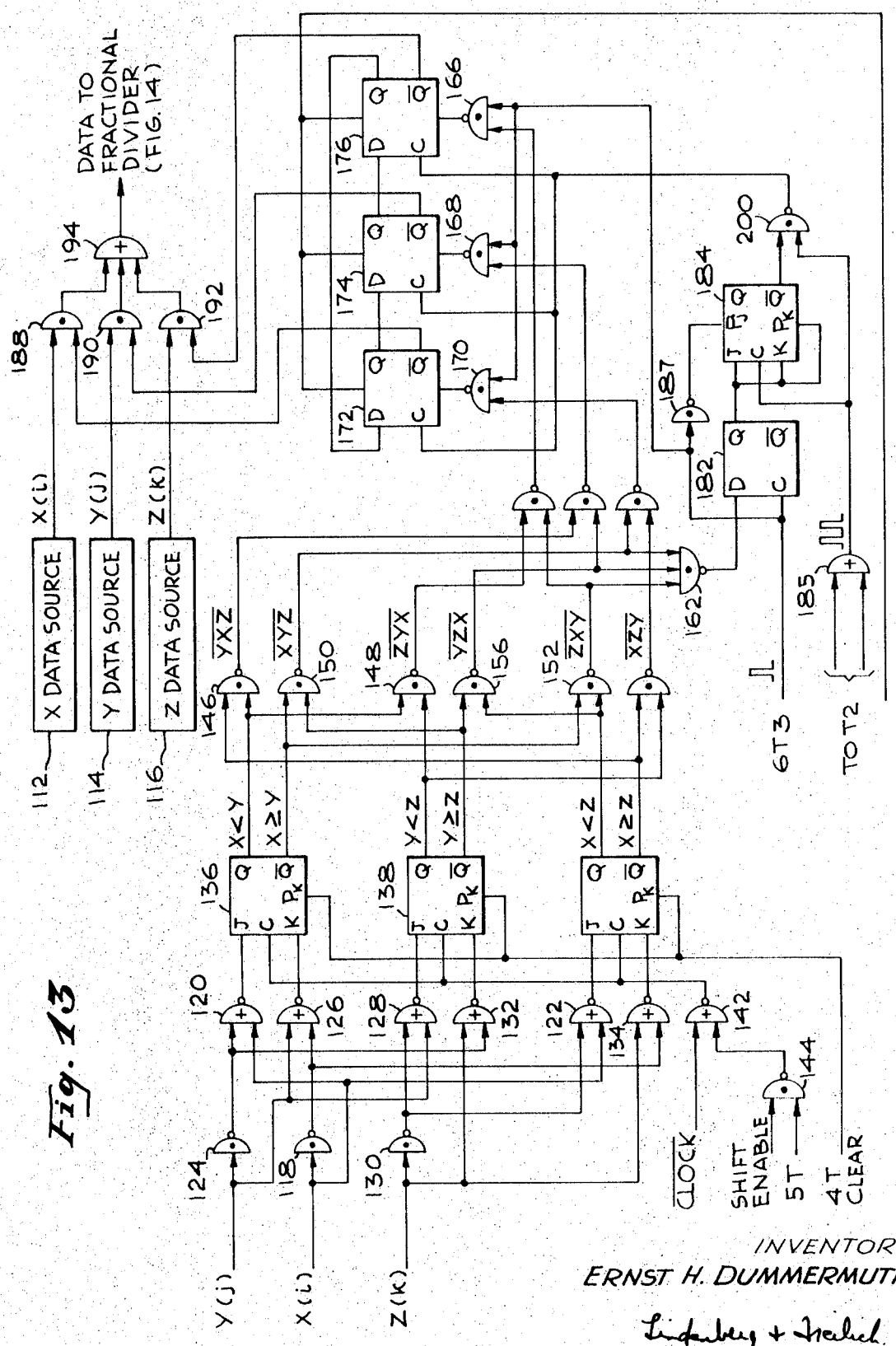
FIGS. 13 and 14 are block schematic diagrams illustrating how the value D may be calculated from X, Y and Z axis motion commands.
Figure 14:
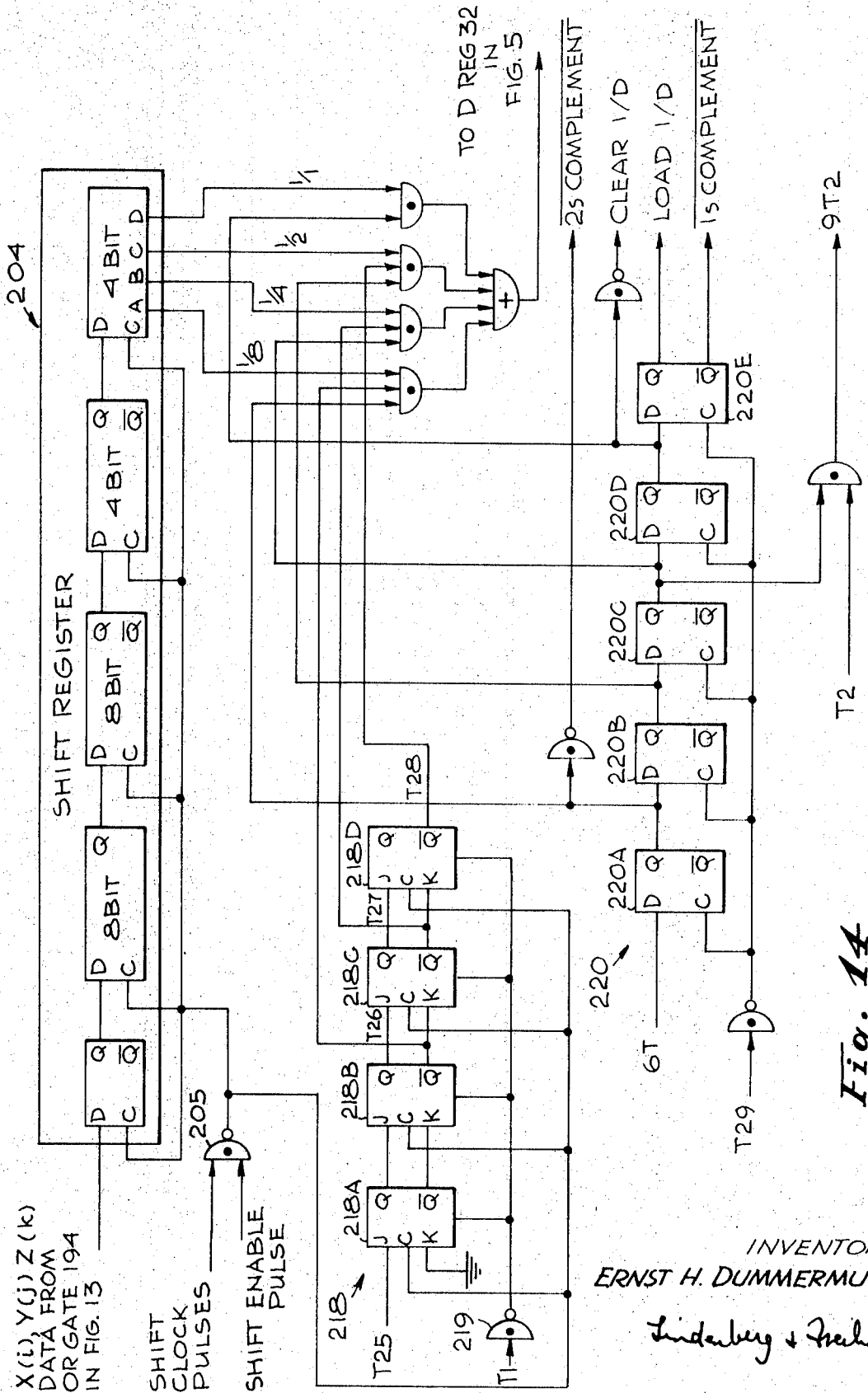

Calculation of D (FIGS. 13 and 14)

The vectorial distance D, which the numerical control machine executes in response to X, Y and Z command pulse trains may be determined by evaluating $\sqrt{X^2+Y^2+Z^2}$. A close approximation to $\sqrt{X^2+Y^2+Z^2}$ is $X+(1/2)Y-(1/8)X+(1/4)Z$ (where X is greater than or equal to Y which is greater than or equal to Z). The condition $X \geq Y \geq Z$ is necessary and sufficient for the approximation to be valid. Of course, if the order of the motion command values is such that Y is greater than or equal to X which is greater than or equal to Z, then corresponding changes must be made in the indicated formula to maintain the approximation valid. Accordingly, it is required that the three input values be in proper order, the largest being called X, the next Y, and the smallest Z. If $(1/2)Y-(1/8)X$ is less than 0 then the value D may be considered as equal to $X+(1/4)Z$.

FIGS. 13 and 14 are block schematic diagrams of the circuitry required for ordering the X, Y and Z command data and then calculating the value of D.

With reference to FIG. 13, assume that the respective X, Y and Z command data is contained in the respective registers or data sources 112, 114 and 116. These may be circulating registers such as the integrand registers found in DDI's. Assume further that the contents of the three registers 112, 114 and 116 are circulated in response to shift pulses such as shown in FIG. 8. The content of the X data source 112 is applied to an inverter 118, and to two NOR-gates 120 and 122. The content of the Y data source 114 is applied to an inverter 124 and to two NOR-gates 126 and 128. The content of the Z data source 116 is applied to an inverter 130, and to two NOR-gates 132 and 134. The output of the inverter 124 is applied to NOR-gates 120 and 132, and the output of the inverter 118 is applied to NOR-gates 126 and 134. The output of the inverter 130 is applied to NOR-gates 128 and 122.

Still with reference to FIG. 13, the outputs of the NOR-gates 120 and 126 are respectively applied to the J and K inputs of a JK flip-flop 136, the outputs of the NOR-gates 128 and 132 are respectively applied to the J and K inputs of another Flip-flop 138, and the outputs of the NOR-gates 122 and 134 are respectively applied to the J and D inputs of still another flip-flop 140. Clock pulses are applied to a NOR-gate 142 whose output is connected to the clock inputs C of flip-flops 136, 138 and 140. The output from a NAND-gate 144 holds the output of the NOR-gate 142 off until a shift enable pulse (FIG. 8) and a 5T pulse (FIG. 10) have been applied to its input. The 5T pulse is an ENABLE signal to specify at what time sorting should take place. The flip-flops 136, 138 and 140 are reset by the application of a clear pulse 4T to their reset terminals indicated as $P_k$.

In the operation of FIG. 13, should the inputs to flip-flop 136 be the same (as can occur when X and Y are both simultaneously 1 or 0 at the particular bit position being tested at the time), then there will be no change in the condition of the flip-flop 136. However, should there be a 1 in the Y-bit position when there is a 0 in the X-bit position, then the NOR-gate 120 output will be high and the NOR-gate 126 output will be low. Thus, when a clock pulse occurs, the Q output of flip-flop 136 will be high, indicative of the fact that X is less than Y. It will be understood that flip-flop 138 compares the same binary digit positions of Y and Z, and flip-flop 140 compares the same binary digit positions of X and Z. It should be noted that the flip-flop 136 is driven to its reset position with its $\bar{Q}$ output high when X is greater than Y.

The X, Y and Z data sources are circulated from their least to their most significant bit positions, and, at the conclusion of the circulation, the flip-flops 136, 138 and 140 will be left in states indicative of which one of the two inputs to each flip-flop is the greater. The logic in FIG. 13 now to be described detects the sequence from the greatest to smallest of the three numbers and then orders these so that they can be used in the determination of D.

The Q output of flip-flop 136 is applied to NAND-gates 146 and 148 and the $\bar{Q}$ output of flip-flop 136 is applied to NAND-gates 150 and 152. The Q output of flip-flop 138 is applied to NAND-gates 148 and 154 and the $\bar{Q}$ output of flip-flop 138 is applied to NAND-gates 150 and 156. The Q output of flip-flop 140 is applied to NAND-gates 156 and 152 and the $\bar{Q}$ output of flip-flop 140 is applied to NAND-gates 154 and 146. The output of NAND-gate 146 is applied to a NAND-gate 158; the output of NAND gate 160 is applied to NAND-gates 150 and 162; the output of NAND-gate 148 is applied to a NAND-gate 164; the output of NAND-gate 156 is applied to NAND-gates 158 and 162; the output of NAND-gate 152 is applied to NAND-gates 164 and 162; and the output of NAND-gate 154 is applied to NAND-gate 160.

It will be understood with respect to FIG. 13 that an output from NAND-gate 146 is obtained when Z<X<Y, thereby indicating a number order sequence YXZ. Similarly, an output from NAND-gate 150 indicates a sequence XYZ, an output from NAND-gate 148 indicates a sequence ZYX, an output from NAND-gate 156 indicates a sequence YZX, an output from NAND-gate 152 indicates a sequence ZXY, and an output from NAND-gate 154 indicates a sequence XZY.

The outputs of the NAND-gates 146, 148, 150, 152, 154 and 156 are applied in appropriate pairs to respective NAND-gates 158, 160 and 164.

The output of NAND-gate 164 is applied as one input to a NAND-gate 166, the output of NAND-gate 158 is applied as one input to a NAND-gate 168, and the output of NAND-gate 160 is applied as one input to a NAND-gate 170. The 6T3 pulse (FIG. 12) serves as an initialing signal and is applied to the input of each of the NAND-gates 166, 168 and 170.

Three flip-flops 172, 174 and 176 in FIG. 13 are connected together as a 3-bit shift register. The outputs of NAND-gates 166, 168 and 170 are respectively employed for resetting respective ones of these flip-flops 176, 174 and 172 to a state representative of the highest number.

The pulses T0 and T2 (FIG. 8) are applied to an OR-gate 185 in FIG. 13 for forming a two-pulse step signal at the output thereof. Flip-flops 182 and 184 in FIG. 13 and the OR gate 185 and a NOR-gate 250 are interconnected so that when flip-flop 184 is reset, both pulses of the step signal are applied to drive the shift register made up of flip-flops 172, 174, 176; on the other hand, when flip-flop 184 is set, only one pulse is applied to the shift register. The $\bar{Q}$ outputs from flip-flops 172, 174 and 176 are respectively applied to AND-gates 188, 190 and 192 along with respective ones of the signals X(i), Y(j) and Z(k) from the X, Y and Z data sources 112, 114 and 116. The outputs of these AND-gates 188, 190 and 192 are in turn applied to an OR-gate 194 via which each of the pulse trains X(i), Y(j) and Z(k) are applied to the fractional divider in FIG. 14.

For the purpose of further explaining the operation of FIG. 13, assume now that X is greater than Y and Y is greater than Z. The $\bar{Q}$ output of flip-flop 136 will be high, the $\bar{Q}$ output of flip-flop 138 will be high and the Q output of flip-flop 140 will be high. As a result, the outputs from NAND-gates 146, 148, 156, 152 and 154 will all be high, while the output from NAND-gate 150 will be low. In response to these outputs, the outputs from NAND-gates 164 and 158 will be low and the output from NAND-gate 160 will be high. The output from NAND-gate 162 will also be high.

It was previously pointed out that the NAND-gates 146 through 156 indicate the order of the size of the X, Y and Z numbers. It will be remembered that the output of AND-gate 150 signifies the size sequence X, Y, Z. As soon as the ordering process has been completed the initializing pulse 6T3 triggers flip-flop 182 and resets one of the three flip-flops 172, 174 and 176 (representative of the highest number) and leaves a "1" in the other two flip-flops of the shift register. In the circuit arrangement shown, flip-flop 172 is reset so that its $\bar{Q}$ output is high and the other two flip-flops are left with 1's therein as the result of a previous set operation, $\overline{5T}$.

The initializing pulse 6T3 is applied through an inverter 187 to set the flip-flop 184. At the beginning of the initializing pulse, if there is a high output from NAND-gate 162, the flip-flop 182 is restored to its state with the Q output high. If the output of NAND-gate 162 is low, then the flip-flop 182 is restored to its state with the Q output low. The two-pulse step output from the OR-gate 185 are applied to NAND-gate 200 and to the clock input of flip-flop 184. In response to the two pulses of the step output, the flip-flop 184 can either toggle twice (J, K and $P_k$ input high) or it remains reset ($P_k$ low). The output Q of flip-flop 182 selects one of these two modes. As a result, flip-flop 184 operates as a divide by one or a divide by two and by qualifying the other leg of NAND-gate 200, either one or both pulses of the step signal can pass. The output of the NAND-gate 200 serves as clock pulses for driving the shift register consisting of flip-flops 172, 174 and 176. Since flip-flop 172 is initially left in its reset state, it can enable an AND-gate 188 to pass the binary number pulse train X(i) from the X command signal data source 112, via the OR-gate 194, into the fractional divider register 204 shown in FIG. 14. As will be described later in connection with FIG. 14, the number entered into the fractional divider shift register 204 is operated on, and thereafter the step signal supplies a pulse to move the count of the shift register from flip-flop 172 to flip-flop 174. This enables AND-gate 190 whereby the binary number Y pulse train Y(j) is then entered, via the OR-gate 194, into the fractional divider shift register 204 in FIG. 14 and operated upon. Thereafter, the step signal supplies a pulse to move the count of the shift register from the flip-flop 174 to the flip-flop 176, thereby enabling NAND-gate 192 and causing the binary number Z pulse train to then be entered, via OR-gate 194, into the fractional divider shift register 204 in FIG. 14 and operated upon. The next time the step signal actuates the shift register, the count moves back to the flip-flop 172 again and operation repeats as described.

From the foregoing description it will be seen that the purpose of the flip-flops 136, 138 and 140 in FIG. 13 and the logic gates which follow them is to determine the size order of the command numbers X, Y and Z. The 3-bit shift register made up of flip-flops 172, 174 and 176 sequences these numbers in their size order to following circuitry. The description of system operation is for size order XYZ. As can be seen from the legends at the outputs of NAND-gates 146, 148, 150, 152, 154 and 156, the order sequence of the command number sizes may be divided into cyclic and counter-cyclic functions. XYZ, YZX, and ZXY may be considered as cyclic functions, and ZYX, XZY and YXZ may be considered as counter-cyclic functions.

Now assume that the size sequence of the command numbers has been determined as YXZ, a counter-cyclic function. By operation of the circuits described, the flip-flop 174 is in its reset state at the beginning of the entry of data to the fractional divider and the other two flip-flops are in their set states. After the Y data has been entered, the shift register has to be instructed to enter X data. With the assumption that has been made, the output of NAND-gate 162 will be low and therefore the initializing pulse 6T3 will drive the flip-flop 182 to its reset state. As a result, the flip-flop 184 is held with its $\bar{Q}$ output high. This will enable NAND-gate 200 to pass both pulses of the step signal from OR-gate 185. As a result, the Q output in the flip-flop stage 174 of the 3-bit shift register is driven two steps which means that its stage 172 next has the reset state, causing the X AND-gate 188 to be enabled. The next time the 3-bit shift register is actuated, the flip-flop 176 is left in its reset state, causing the Z AND-gate 192 to be enabled. The next time the 3-bit shift register is actuated, the flip-flop 176 is left in its reset state, causing the Z AND-gate 192 to be enabled. The next time the 3-bit shift register is actuated, the flip-flop 172 is left in its reset state again, causing the X NAND-gate 188 to be enabled again and so on.

It should therefore be clear from the foregoing that the arrangement of the NAND-gate 162, the flip-flops 182 and 184, and the NAND-gate 200 operate to provide cyclic or countercyclic enablement of AND-gates 188, 190 and 192 in accordance with the sizes of the X, Y and Z command numbers established by the preceding logic.

FIG. 14 is a block schematic diagram of circuitry for performing the fractional operation-1/8X,+1/2Y, +1/4Z,+X. The largest command number is first entered into the fractional divider shift register 204. The four stages at the end of the register 204 which contain the four least significant bits have output lines respectively designated as 1/1 for the line from the least significant bit position, 1/2 for the line from the next least significant bit position, 1/4 for the line from the third least significant bit position, and 1/8 for the line from the fourth position from the least significant bit. These four lines are respectively connected to four AND-gates 206, 208, 210 and 212. The output of all of these AND gates are applied to an OR-gate 214, the output from which is in turn applied to the D register or the integrand register of the D DDI, shown as 32 in FIG. 5.

The principle of the arrangements shown for division is simply that by reading the binary number in the register out of the register in a manner so that the bit which is next to the least significant bit position becomes the least significant bit of the new number, the number in the register is divided by two. Similarly, by reading the number out of the register in a manner so that the second bit from the least significant bit position of the number becomes the least significant bit of the new number, the number in the register is divided by four. Of course, by reading the number out of the register, least significant bit first, and retaining all of the bits of the number which is so read out, the contents of the divide register are transferred intact to the D register 32 (FIG. 5).

The enabling of the AND gates 206, 208, 210 and 212 to accomplish the indicated divisions is a function of the two shift registers 218 and 220. The register 204 shifts in response to shift clock pulses (FIG. 8). These are applied to an AND-gate 205 which is enabled by a shift enable pulse. The output of the AND-gate 205 is applied to the C inputs of the stages of both the registers 204 and 218.

The shift register 218 consists of four flip-flop stages 218A, 218B, 218C and 218D. These are reset upon the occurrence of a T1 clock pulse applied via an inverter 219, and are driven in response to shift clock pulses. However, they are not called into operation until the occurrence of a T25 clock pulse to the J input of flip-flop 218A, to set flip-flop 218A which then remains set for the rest of the shift pulses. Therefore, logic "1's are filled into the shift register 218 starting with the pulse T25. The $\bar{Q}$ outputs of the flip-flops 218B, 218C and 218D are connected to the fractional AND-gates 212, 210 and 208 respectively. This arrangement functions to disable the fractional AND gates sequentially after the most significant bit of the number in the register 204 has passed by.

A shift register comprises five flip-flop stages 220A through 220E. At T29 time they are shifted one bit position. During 6T time (FIG. 10) the data input of the flip-flop 220A is qualified. Therefore, a 1 is entered into the flip-flop 220A with the next T29. At the following T29, the data input of the flip-flop 220A is made low and 220B stores a 1. In this manner a single 1 is shifted through the entire register 220.

In operation of FIG. 14, the largest command number is initially entered into the shift register 204. At T25 time, the flip-flop 218A is set. The succeeding flip-flops are set in response to the succeeding clock pulses. At the next T1 time all the flip-flops are reset. Thus, the respective AND-gates 212, 210 and 208 are disabled successively. After 6T time (i.e., at 7T), the flip-flop 220A is set thus providing an enabling input to the NAND-gate 212 whereupon, by stepping the contents of the shift register 204 out through AND-gate 212, one-eighth of X is obtained. This is entered into the D digital data integrator in 2's complement form. Thereafter, the Y command number is introduced into the register 204, and this time the AND-gate 208 is enabled at 8T time. The number read out of the register now is equal to ½ Y and it is read directly out to the register of the D DDI to be added to —⅛X. The D register content is then tested. If the sum is less than 0 (by checking if the most significant bit is set), the register 204 is cleared; otherwise the content is retained Next, the AND-gate 210 is enabled at 9T time to enter ¼Z into the D DDI. Finally, the largest command number is entered into the register 204 again and AND-gate 216 is enabled. The 1/D register is cleared by the output from flip-flop 220D which occurs at 10T time. The AND-gate 206 which is enabled at 10T time enters the contents of the register 204 into the register of the D DDI to be added to the contents thereof. Thereafter, at 11T time, the 1's complement of the number in the D register of the DDI is entered into the 1/D register. (The 1's complement of D is the inverted data of D, and thus is obtained by applying the data to an inverter).

From the foregoing description it should be appreciated how the value of D is computed and the 1's complement thereof taken, which is approximately equal to the value 1/D. The approximated 1/D value is rapidly converged to the proper value by operation of the arrangement shown in FIG. 5.

Normalization Technique and Marker Generation (FIG. 15)

FIG. 15 illustrates a block schematic diagram of a circuit arrangement for performing the operation of normalization, and for generating a marker indicative of the location of the least significant digit within a register after the process of normalization has occurred. An up-counter 222 is enabled to count clock pulses in the presence of a count enable signal from the $\bar{Q}$ output of a flip-flop 283. The count enable signal is applied to an AND-gate 226. The other inputs to the AND-gate 226 are shift clock pulses (FIG. 8). The output of the AND-gate 226 goes to a NOR-gate 228. The NOR-gate output is applied to a following NOR-gate 230, whose output drives the counter 222. The principle which is employed here is simple. To count the number of leading 0's in a register, data is inspected as it passes past a previously selected inspection location. Each time a leading 0 is detected at the inspection location, the up-counter 222 is incremented by 1. Should a 1 occur, the counter is reset to zero commencing counting anew upon the inspection of the next digit. After a complete shift cycle, the counter 222 will be left with a count indicative of the number of 0 digits above the most significant 1 digit which is present in this number. In accordance with this invention, the inspection of the digits takes place at the most significant bit position at the head end or entrance end of the register 222. This allows counting of the leading 0's as the register (i.e. a DDI register) is just being loaded.

In the use of this invention in a numerical control system, velocity information may be programmed or identified with a $f$ code for the V/D system or designated as an $e$ code number for the computing mode placed in the same register. To normalize the data in the velocity as well as the axis DDI's, the number of leading 0's in these registers have to be counted.

The inspection locations (MSB or sign bit) of these registers are connected to the respective terminals 231, 232, 234 and 236 in FIG. 15 labeled (sign) $f$ or $e$ data, (sign) X data, (sign) Y data, and (sign) Z data respectively. The respective terminals are connected to respective NAND-gates 237, 238, 240 and 242. The second input to the NAND-gate 237 is connected to a timing signal 3T, whereas the second inputs of the NAND-gates 238, 240, 242 are connected to a timing signal 4T. The outputs from these four (open collector) NAND gates are connected together and applied to a succeeding NAND-gate 246. This input to the NAND-gate 246 is also connected through a resistor 246 to a source of positive potential, here indicated as +5 volts.

During the time interval 3T3, the reset up signal is present at terminal 229. The leading 0's of the $f$ or $e$ register (register 30 in FIG. 16) are counted during 3T. As long as a 0 is applied to terminal 231, the NAND-gate 246 is maintained inoperative and the up-counter 222 steps up by one count in response to each clock pulse. A 1 applied to terminal 231 enables NAND-gate 246. Its output is inverted by an inverter 250 and then causes the up-counter 222 to be reset. After the 3T interval, the counter 222 will be left with a count indicative of the number of 0 digits contained in the $f$ or $e$ data.

Now, only if an $f$ number had been programmed, the contents of the counter 222 are transferred in response to a transfer pulse via NAND-gates 252A to 252E into the down-counter 256; if an $e$ number had been programmed no transfer signal is received and the counter 256 remains reset.

During the time interval 4T, the leading 0's of the X, Y and Z registers are simultaneously counted. If a 0 appears simultaneously at the terminals 232, 234 and 236, the up-counter 222 steps up one count; should a 1 occur at any of the three terminals 232, 234, and 236, the counter 222 is reset. After the 4T interval, the counter 222 will be left with a count indicative of the number of 0 digits common to the three command numbers above the most significant 1 digit which is present in these numbers. The contents of the up-counter 222 are then transferred in response to a transfer signal, via NAND-gates 259A to 259E, into the down-counter 258, and after this transfer signal the up-counter 222 is reset to zero by a 5T3 signal.

Summarizing the conditions after the termination of the inspection of the command numbers, the up-counter 222 is reset, the down-counter 256 stores the number of zeros in the $f$ command (or is reset for an $e$ command), and the down-counter 258 stores the number of zeros in the largest axis command number. The up-counter 222 and the down-counters 256 and 258 have a maximum count of 28. In addition, their counting states are identical.

During the time interval 5T, some of those previously counted 0's will be removed from their corresponding DDI's. Clock pulses received through the AND-gate 226 and the NOR-gate 228 are applied to the NOR-gate 230 to drive the up-counter 222. These clock pulses are also applied through two NOR-gates 264 and 266 to drive the respective down-counters 256 and 258.

The 0's from the $f$ number (if there are any) will be removed first. The technique used is to withhold shift pulses as the number is circulated from the least to the most significant bit end of the register. For this purpose, a flip-flop 283 is reset at T2 time, and a flip-flop 268 is set at 5T2 time. The $\overline{Q}$ output of the flip-flop 268 is now low, thereby inhibiting the application of shift pulses to the F DDI (30 in FIG. 16) as long as it remains low. Clock shift pulses however continue to be applied through the NOR-gate 264 to the down-counter 256. For every deleted shift pulse the down-counter 256 reduces its contents by one count until it reaches zero. This is detected by a zero detector 274. The output of the zero detector 274 enables the K input of the flip-flop 268, and the flip-flop 268 is reset, whereby shift pulses are no longer blocked from the F DDI (shown as V in FIG. 16).

The J input of a flip-flop 270 is also made high by the output of the zero detector 274 which results in setting the flip-flop 270 forcing its $\overline{Q}$ output low to inhibit shift pulses to the axis DD's (312, 314 and 316 in FIG. 16). The down-counter 258 is now enabled to operate as a result of the low state of $\overline{Q}$ qualifying the NOR-gate 266.

Every shift pulse deleted from the axis DDI's reduces the contents of the down-counter 258 by one count. When the down-counter 258 has counted down to the value 1, as detected by the 1 detector 272, the K input of the flip-flop 270 is qualified, and the flip-flop resets, enabling the application of shift pulses to the axis DDI's again. This operates to remove all but one leading 0 from the axis registers.

It is to be noted that the down-counter 256 also receives clock pulses together with the down-counter 258. The NOR-gate 269 performs an OR function with the Q outputs of flip-flop 268 and flip-flop 270. Therefore, the down-counter 256 essentially underflows, or counts backward from 0, by the amount of shift pulses removed from the axis DDI's.

The up-counter 222 is also enabled to count shift clock pulses during 5T time. Therefore, the number reached by the up-counter is the sum of the 0's deleted from the $f$ DDI and the 0's removed from the axis DDI's.

As previously explained in the theory of the V/D machine (programmed with $f$ code), a total of 24 leading 0's are to be removed. Therefore, the up-counter 222 has a decoding NAND-gate 285 connected to its flip-flop outputs. Upon reaching the count of 24, a NAND-gate 285 is caused to apply an output through a NAND-gate 281 to flip-flop 283, driving it to its set state. The $\overline{Q}$ output of the flip-flop 283 going low then causes the flip-flop 270 to be reset, thereby terminating the count-down mode of operation of the down-counter 258.

The arrangement of counters just described operates to produce normalization for both the V/D system addressed with the $f$ code, as well as the computing system addressed with the $e$ code. Generally speaking, in the V/D mode the down-counter 258 cannot reach a count of 1 because the up-counter 222 has reached a count of 24 already, whereas in the computing mode, the down-counter 258 reaches the count of 1 and the up-counter 222 has not reached the count of 24.

After the normalization is completed, the down-counter 256 contains a number (underflow) indicative of the number of shift pulses deleted from the axis DDI's. At the beginning of the 6T time interval this number is transferred, via NAND-gates 223A to 223E, into the up-counter 222. At this time also, a marker enable signal is received from a marker enable signal source 260, which enables a NAND-gate 262 to allow 28 shift clock pulses for every iteration, to be applied to the up-counter 222 via NOR-gates 228 and 230. Since the up-counter 222 has a maximum count of 28, it will cycle through once for every iteration. A NAND-gate 282 acts as an overflow detector to set a flip-flop 284 in response to which it generates a pulse at the moment of the overflow of the up-counter 222. The time at which such overflow occurs has been previously established by presetting the up-counter 222 with the count output of the down-counter 256. The pulse appearing at the marker output of the flip-flop 284 during each iteration cycle marks the point in time at which the least significant bit of the now normalized data appears at the low end of the axis DDI's (FIG. 16, 312, 413, 316).

In order to obtain as many overflow pulses in a pulse train from a DDI as the value of the binary number in the integrand, as many iteration cycles are required as there are binary bit places in the integrand. An iteration counter 336 (FIG. 16) is used to count the iterations applied to the axis DDI's. For an $n$ bit register, $2^n$ iterations are required. The normalization process effectively shortens the register length. If $i$ leading 0's have been removed from the axis DDI's, then the total number of iterations required is $2^{n-i}$. Looking at this fact in another way, it can be stated that the integrands, by being normalized $i$ places, have been multiplied by $2^i$; therefore, only $\frac{1}{2^i}$ of the total number of iterations ($2^n$) are required. $2^n/2^i$ however yields the same formula $2^{n-i}$. To count the number of iterations, the iteration counter 336 (FIG. 16) is incremented by one count each time the axis DDI's perform an iteration. The increment is added at the $i$th bit position or, in terms of a logical signal, at marker time. When the iteration counter overflows, $2^{n-i}$ increments have been processed.

The marker also serves another purpose. It is well known from the literature that cross-coupling two axis DDI's yields the sinercosine generator or circular interpolation. The overflow of the first DDI increments the second, whereas the overflow of the second DDI decrements the first. After normalization, incrementing/decrementing must be performed at the $i$th bit position. The marker identifies the $i$th bit position.

It will be understood that incrementing the integrand of one axis DDI could cause a carry into the next higher bit position. An extra bit is reserved for this overflow since the axis DDI's are normalized all but one place as a result of the operation of the 1 detector 272 in conjunction with the down-counter 258.

Feedrate and Contour Generator (FIG. 16)

FIG. 16 is a block schematic diagram of a feedrate and contour generator in accordance with this invention and illustrating how the circuits described may be integrated for the function of controlling a numerical machine tool. In accordance with this invention, the velocity may be entered as a FRN (feedrate) number coded $f$, or an IPM coded $e$. In the latter case, the X, Y and Z data will be used to calculate the 1/D value. In the first case, the 1/D DDI is completely bypassed (or filled with all 1's).

As is usual the data for machine tool control may be stored on tape and is provided to the system by the usual tape reader 292 employing the usual data distribution control 294. If the data is furnished in BCD to (binary coded decimal) form, then a BCD binary converter 296 is required, because the system operates in straight binary. The BCD-to-binary converter 296 furnishes an X command buffer 298, a Y command buffer 300, and a Z command buffer 302 with the respective X, Y and Z commands and a V command buffer 304 with the velocity command. If the path to be cut is a circular one, then the additional $i$ data, $j$ data and $k$ data required for circular paths is loaded into an $i$ command buffer 306, a $j$ command buffer 308, and a $k$ command buffer 310.

If the system is in circular incremental mode, then the numbers in the X, Y and Z command buffers 298, 300, and 302 are next transferred into the respective X, Y and Z axis DDI's 312, 314 and 316 and from there transferred into respective endpoint counters 324, 326, 329. Then the contents of the axis DDI's are cancelled and the $i, j$ and $k$ data are entered into the axis DDI's 312, 314 and 316 respectively. Thereafter, normalization takes place with the X, Y and Z axis DDI's now containing $i, j$ and $k$.

It should be appreciated that the feedrate number in a circular move is defined as V/R. To apply the concept of feedrate computing for circular interpolation a value 1/R must be generated to be placed into the 1/D DDI 28. Since $i, j$ and $k$ are the radius components, the radius R (assuming X-Y plane) is computed as $\sqrt{i^2+j^2}$. Using the approximation in accordance with this invention:

$R \approx i + \frac{1}{2}j - \frac{1}{8}i$ if $\frac{1}{2}j - \frac{1}{8}i \geq 0$ ($k=0$)
$R \approx i$ if $\frac{1}{2}j - \frac{1}{8}i < 0$ ($k=0$)

The above is the same formula as used to compute
$D \approx X + \frac{1}{2}Y + \frac{1}{8}X + \frac{1}{4}Z$ if $\frac{1}{2}Y - \frac{1}{8}X \geq 0$ by replacing $D \rightarrow R$,
$X \rightarrow i$, $Y \rightarrow j$ and $Z = 0$.

It should be noted that the system also is provided with circuitry designated as Plane Code and Steering Circuit 330. This circuit serves the function of being instructed as to whether or not a path which is to be performed is circular or linear and, if it is circular, in which plane the circular path is to be executed. This is well known circuitry and a description thereof is therefore not provided.

If the machine is of the absolute type, then the information which is loaded into the X, Y and Z command buffers corresponds to the X, Y and Z coordinates related to the machine origin. It is therefore necessary to load the X, Y and Z DDI's with this information; however the X, Y and Z position data also has to be entered into the axis DDI's in 2's complement form. This present position information is maintained by an X position counter 318, a Y position counter 320 and a Z position counter 322. The difference between the X, Y and Z command numbers and the numbers in the X, Y and Z position counters is taken and then loaded into the X, Y and Z axis DDI's. This is a well known operation and the details for it are accordingly not given. In the embodiment being considered herein the numbers in the X, Y and Z axis DDI's have to be in positive form, since iteration and normalization can only be performed using positive numbers. If a negative incremental command is present in one of these axis DDI's, then a special "servo sign" flip-flop (not shown) is required and set to "-minus," and a 2's complement cycle is initiated. The data is recirculated in 2's complement form. Once the X, Y and Z axis DDI's have been loaded, the next step to be performed is the previously described normalization step.

If a circular command is to be executed, then, before normalization takes place, the incremental numbers which are entered in the X, Y and Z axis DDI's 312, 314 and 316 are loaded into an X end-point counter 324, a Y end-point counter 326, and a Z end-point counter 328.

The circuits for actually performing the normalization are represented by the block 332 in FIG. 16 which represents the circuits previously described in FIG. 15.

The total number of iterations (required for linear moves) are counted in the iteration counter 336 which may typically include an $n$-bit shift register with increment-decrement capability.

The next operation that occurs in the calculation of the value of D (R). This is done by apparatus represented by the block 334 which represents the circuitry previously shown and described for this purpose. The registers in the D (R) and 1/D (1/R) DDI's are loaded. 1/d (1/R) is the 1's complement of D (R). The oscillator 38 is then started. The operation of the structures 30, 32, 34 and 28 are then as has been described previously.

The conversion of the value of 1/D (1/R) is so rapid that, after the loading operations into the D (R) and 1/D (1/R) registers have occurred, the entire system may be permitted to commence operating in response to pulses which are fed out of the V DDI into the X, Y and Z axis DDI's. The X, Y and Z axis DDI's will provide command pulse trains to the usual X, Y and Z servos (not shown). These servos are controlled in a well-known manner, and provide feed back pulses which, in the case of an absolute machine, are fed to the X, Y and Z position counters 318, 320 and 322 to update the position information. In the case of circular operation, the X, Y and Z servo pulses are also used to cause the X, Y and Z end-point counters 324, 326 and 328 to count down to zero.

It is to be understood that the timing circuits shown in FIGS. 9 and 11 are used to transfer information from the command buffers 298, 300, 302, 306, 308 and 310 in FIG. 16, into the respective DDI's 312, 314 and 316 and to control the normalization process, whereas the timing circuits of FIG. 7 are the basic drives for the circulation of the shift registers (command buffers and DDI's).

The operation of the end carry delay chain shown in FIG. 9 can be summarized by the following sequential operations for clock shift pulses 1T–11T.

1T–Previous process complete; clear all DDI's
2T–Transfer X, Y, Z and $f, e$ if addressed
3T1–Clear servo sign
3T(T1T2T3)–Enter new servo sign; initiate 2's complement if axis command is negative
3T–Apply 2's complement if initiated; count leading 0's in $f(e)$DDI
3T3 (composite signal of gate 102 in FIG. 11)–Clear up-counter 222 before counting
4T1–Reset the down-counter 256
4T(T1T2T3)–Transfer the contents of the up-counter 222 into the down-counter 256
*4T3–Clear the up-counter 222
4T–If circular, send contents of axis DDI's to end point counters 324, 326 and 328; if circular, transfer $i, j$ and $k$ into axis DDI's by cancelling old contents; count leading zeros in axis DDI's; clear sorting logic (FIG. 13)

5T1–Reset the down-counter 258

5T(T1T2T3)–Transfer the content of the up-counter 222 into the down-counter 258

5T2–Set flip-flop 268 to initiate normalization

*5T3–Clear the up-counter 222 (FIG. 15)

5T–Remove the leading 0's; sort by magnitude

*6T2–Clear the up-counter 222 (FIG. 15)

6T3–Transfer the content of the down-counter 256 (FIG. 15) into the up-counter 222; initialize the sorting logic (FIG. 13); enable the marker source 260

6T–Apply signal to FIG. 14 fractional divider for extension of the end carry delay chain 7T–Enter −½X into the D DDI 8T–Add +½Y to the content of the D DDI 9T2–Test for sum being negative 9T–If the sum is negative, cancel content and load +½Z into the D DDI; if the sum is positive, add +½Z to the content of the D DDI 10T–Add +X to the content of the DDI; clear the 1/D DDI 11T–Enter the 1's complement (inverted data of the D DDI) into the 1/D DDI; start the contouring process.

It should be noted that if the system is in the V/D mode steps 7T to 11T are not needed, they are simply bypassed. The 1/D DDI is filled with all 1's to make it look like it is being bypassed. The time being used up between blocks for the end-carry delay chain equals 36 microseconds for the V/D machine and 66 microseconds for the computing machine.

While the detailed description of normalization and generation of 1/D was given for a fully buffered machine, it will be appreciated that the same concept with slight modification can be applied to nonbuffered machines. In such a case, the X, Y and Z data must appear first on tape. The incremental command is then computed and sent to the axis down-counters. If a circular move is programmed, i, j and k is then read from tape into the axis DDI's. From there on, normalization and 1/D(1/R) generation is identical.

There has accordingly been described and shown herein a novel and useful arrangement for a feedrate generator and a contour generator wherein DDI's are employed as rate multipliers, wherein the process of normalization is performed for the purpose of speeding up the operation of the machine, and wherein the desired velocity is entered into the numerical control machine either in the form of a feedrate number FRN (coded f) or in terms of inches per minute IPM (coded e).

The embodiments of the invention in which an exclusive property or privilege is claimed are defined as follows:

1. In a machine tool numerical control system,
a first rate multiplier,
means for entering a binary number into said first rate multiplier,
a different axis rate multiplier for each axis,
means for entering an axis motion command binary number for each axis into a respective axis rate multiplier,
said first and axis rate multipliers each having a plurality of stages for parallel storage of numbers,
a source of pulses, means for applying pulses from said source to said first rate multiplier to be multiplied thereby,
means for applying the output of the first rate multiplier to all of the axis rate multipliers to be multiplied thereby,
means for applying the output of all of the axis rate multipliers to the machine tool to control its motion, and
means for decreasing the time required for operation of said machine tool comprising means for shifting all of the motion command binary numbers in said axis rate multipliers by the same number of stages toward a most significant bit stage of said axis rate multipliers until the largest of said motion command binary numbers has its most significant bit located in the most significant bit stage of its axis rate multiplier.

2. A numerical control system as recited in claim 1 wherein there is also included means for shifting the binary number in said first rate multiplier towards the most significant bit stage of said first rate multiplier.

3. A numerical control system as recited in claim 2 wherein there is included means for ordering the sequence of operation of both of said means for shifting to order the means for shifting the binary number to occur first and the means for shifting all of the motion command numbers to occur next, and there is included means for counting the number of places shifted by both of said means for shifting and to terminate the operation of said means for shifting all of the motion command numbers when a predetermined count is attained.

4. In a numerical control system as recited in claim 1 wherein said source of pulses includes means responsive to the values of the shifted motion command binary numbers to calculate a value D where D represents the vectorial distance represented by all of the axis motion command binary numbers,
means responsive to the value of D to calculate a value 1/D including a 1/D rate multiplier, a source of oscillations, and means for driving said 1/D rate multiplier with oscillations from said source, and
means for applying the output of said 1/D rate multiplier to said first rate multiplier.

5. In a numerical control system for a machine tool of the type wherein a binary number is entered into a rate multiplier means,
wherein means are provided for applying a pulse train to said rate multiplier means to produce an output pulse train, and wherein further means are provided for driving said machine tool responsive to said output pulse train; the improvement comprising apparatus for reducing the time required for operation,
said apparatus comprising: normalizing means including an up-counter for counting the number of 0's between the most significant bit position of the binary number in said rate multiplier means and the most significant bit position of said rate multiplier means,
means for circulating binary numbers out from the least significant bit position of said rate multiplier means and back into said rate multiplier means through its most significant bit position and
means for withholding the operation of said means for circulating for a portion of its circulating cycle responsive to the count of said up-counter to leave said binary number with its most significant bit position in the most significant bit of the rate multiplier means.

6. In a numerical control system as recited in claim 5, wherein said means for withholding the operation of said means for circulating for a portion of its cycle includes:
a first down-counter,
means for transferring the count of said up-counter to said first down-counter,
means for applying shift pulses to said first down-counter to cause it to count down, and
means for preventing application of said shift pulses to said rate multiplier which cause it to circulate until said down-counter reaches a predetermined count.

7. In a numerical control system as recited in claim 6 wherein said rate multiplier means comprises an axis rate multiplier for each axis of said machine tool, wherein a binary number in each axis rate multiplier represents a desired motion command for that axis, and wherein said up-counter counts the number of zeros between the most significant bit position of the largest of said motion command binary numbers in its axis rate multiplier and the most significant bit position of its axis rate multiplier.

8. In a numerical control system as recited in claim 5 wherein said further means for driving said machine tool responsive to said output pulse train comprises a plurality of axis rate multipliers, one for each axis, a motion command binary number being entered into each axis rate multiplier, and wherein said means for withholding the operation of said means for circulating includes:
a first down-counter,
means for transferring the count of said up-counter to said first down-counter, means for resetting said up-counter to a zero count,
means for causing said up-counter means to count the number of 0's between the most significant bit position of the largest of said motion command binary numbers in its axis rate multiplier and the most significant bit position of its axis rate multiplier,
a second down-counter,
means for entering the count of said up-counter into said second down-counter,
means for resetting said up-counter to a 0 count,
a source of shift pulses,
first means for applying shift pulses from said source to said rate multiplier means to cause it to circulate the binary number therein from out of the least significant bit position back into the most significant bit position of said rate multiplier means,
second means for applying shift pulses from said source to said up-counter and first down-counter simultaneously with their application to said first means to respectively produce up-counting and down-counting,
first means for blocking the application of shift pulses from said means for applying shift pulses to said rate multiplier means until said down-counter has counted to zero whereby said binary number in said rate multiplier means will be placed in said rate multiplier means with its most significant bit in the most significant bit position of said rate multiplier means,
third means operative responsive to said first up-counter attaining a zero count for applying shift pulses from said source to all of said axis rate multipliers to cause each of them to circulate their command binary numbers from out of the least significant bit positions back into the respective axis rate multipliers through the most significant bit positions, said third means for applying shift pulses including means for applying shift pulses to said up-counter and said first and second down-counters simultaneously with the application of shift pulses to all of said axis rate multipliers, and
second means for blocking the application of shift pulses to said axis rate multipliers until said up-counter attains a predetermined count whereby the largest axis command binary number is placed in its axis rate multiplier with its most significant bit at a location adjacent the MSB location in said axis rate multiplier determined by the predetermined number.

9. In a numerical control system as recited in claim 5 wherein said further means for driving said machine tool responsive to said output pulse train comprises a plurality of axis rate multipliers, one for each axis, and means for entering a motion command binary number into each axis rate multiplier, and wherein said means for withholding the operation of said means for circulating includes:
a first down-counter,
means for transferrring the count of said up-counter to said first down-counter,
means for resetting said up-counter to a zero count,
means for causing said up-counter to count the number of o's between the most significant bit position of the largest of said motion command binary numbers in its axis rate multiplier and the most significant bit position of its axis rate multiplier,
a second down-counter,
means for entering the count of said up-counter into said second down-counter,
means for resetting said up-counter to a zero count,
a source of shift pulses,
means for applying shift pulses from said source to all of said axis rate multipliers to cause each of them to circulate their command binary numbers from out of the least significant bit positions back into the respective axis rate multipliers through their most significant bit positions, said means for applying shift pulses including means for applying shift pulses to be counted to said first and second down-counters simultaneously with the application of shift pulses to all of said axis rate multipliers, and
means for blocking the application of shift pulses to said axis rate multipliers until said second down-counter attains a predetermined count whereby the largest axis command binary number is placed in its axis rate multiplier with its most significant bit at a location adjacent the most significant bit location of said axis rate multiplier determined by the predetermined number.

10. In a numerical control system as recited in claim 9 whereby said up-counter has a count capacity equivalent to the number of bit locations in an axis rate multiplier, and there is included means for transferring the count in said first down-counter to said up-counter whereby each time said up-counter is driven by shift pulses simultaneously with said axis rate multipliers its overflow count is a marker pulse indicating that the least significant bit of the numbers in the axis rate multipliers are in their least significant bit positions.

11. In a numerical control system for a machine tool having a source of data including axis motion command data and vectorial velocity data V for commanding machine tool operation in response to said data,
means for calculating the value of 1/D from said axis command data where D is the vectorial distance commanded,
a source of oscillations at a frequency of $f_o$,
first means for multiplying oscillations from said source by the value of 1/D to produce a pulse train having a first resultant frequency $f_o \cdot 1/D$.
second means for multiplying said first resultant frequency $f_o \cdot 1/D$ pulse train by the value of said vectorial velocity data to provide a pulse train having a second resultant frequency $f_o \cdot V/D$, and
third means for multiplying the second resultant frequency $f_o \cdot V/$ pulse train from said second means for multiplying by the value of each axis motion command to produce a motion command pulse train for each axis resulting in a machine tool vectorial velocity proportional to $f_o \cdot V$.

12. In a numerical control system as recited in claim 11 wherein said first, second and third means for multiplying each constitutes a digital differential integrator circuit.

13. In a numerical control system as recited in claim 11 wherein said means for calculating /D includes:
means for ordering said axis motion command data into a highest value axis command, a next highest value axis command and a third highest axis value command,
means for calculating the value of one-half of the second highest value axis command,
means for calculating the value of one-eighth of the highest value axis command,
means for subtracting the value of one-eighth of the highest value axis command from the value of one-half of the second highest axis command to produce a difference value,
means for determining whether or not said difference value exceeds zero,
means for determining the value of one-fourth of the third highest value axis command,
means for adding said difference value if it exceeds zero to said value one-fourth of the third highest value axis command to produce a sum, and
means for adding said sum to the value of said highest value axis command to produce the value of D.

14. In a numerical control system as recited in claim 13 wherein said means for calculating 1/D further includes:
means for multiplying the frequency of said oscillations from said source by a constant C to produce oscillations having a frequency of $f_o C$,
means for multiplying said first resultant frequency $f_o \cdot 1/D$ pulse train by the value of D to produce an oscillation having a frequency proportional to $f_o \cdot 1/D \cdot D$, means for comparing the frequency $f_o C$ and the frequency $f_o \cdot 1/D \cdot /D$, D and producing an output indicative of said difference, and means for correcting the value of 1/D responsive to the output of said means for comparing to cause said difference to null.

15. In a numerical control system as recited in claim 11 wherein said third means for multiplying includes normalizing means for multiplying the numerical value of all of said axis motion command data by $2^i$ where $i$ is a value equal to the number of 0's which exist between the highest possible value axis command expressed as a binary number and the actually existing highest value axis command expressed as a binary number.

16. In a numerical control system for a machine tool having a source of data including axis motion command numbers and vectorial velocity numbers for commanding machine tool operation in response to said data, a rate multiplier means for each axis, each said rate multiplier means having a register means including a plurality of stages, there being a least significant bit stage at one end of said register and a most significant bit stage at the other end of said register, means for entering each axis command number into a different one of said register means with its least significant bit in the least significant bit stage, normalizing means including means for moving the largest axis command number within its register the number of stages required to place its most significant bit in the most significant bit stage, and for moving said other axis command numbers within their respective registers a similar number of stages toward the most significant bit stage as the largest command number was moved, said means for moving the largest axis command number within its register the number of stages required to place its most significant bit in the most significant bit stage, and said means for moving said other axis command numbers within their respective registers a similar number of stages toward the most significant bit stage as the largest command number was moved includes:

counting means for establishing a count equal to the number of stages between the highest order stage and the stage in which the most significant bit of said highest command number is placed, a source of shift pulses for simultaneously circulating the contents of each of said register means once said least significant stage into said most significant stage, means for applying shift pulses from said source to each of said register means to cause them to circulate their contents out from their least significant stage positions and into their most significant stage positions, and means responsive to said counting means for preventing a number of shift pulses from being applied to each of said register means equal to the count in said counting means, means responsive to the values of the command numbers on said register means for determining the value 1/D where D is the vectorial distance commanded by said command numbers, and means responsive to said vectorial velocity number, said value 1/D and each axis command number for providing a pulse train for each axis which has a frequency proportional to the product of said vectorial velocity number, said value 1/D and the respective axis command number.

17. In a numerical control system apparatus for generating a feedrate pulse train in response to data representative of a desired velocity for a numerical control system and data representative of a desired vectorial path $D = \sqrt{X^2 + Y^2 + Z^2}$ expressed as distance commands along coordinate axes $X$, $Y$ and $Z$, said apparatus comprising:

an axis register means for each axis for storing the distance commands for that axis, a D register means responsive to the distance commands stored in all of said axis register means for establishing the value of $D$ in said $D$ register means, a source of oscillations at a frequency $f_o$, a 1/D register means, means for establishing the 1's complement of the value $D$ in said register, means foe entering the 1's complement of the value D from said D register means into said 1/D register means, means including said 1/D register means for dividing the frequency $f_o$ by the value of the contents of said 1/D register means to produce a pulse train having a frequency $f_o \cdot 1/D$, means including said D register means for multiplying pulse train having a frequency $f_o \cdot 1/D$ by the value of the contents of said D register means to produce a pulse train having a frequency $f_o^* \cong f_o$ means for comparing the frequency $f_o$ with the frequency $f_o^*$ and producing an error signal responsive thereto, means for correcting the value of 1/D in said 1/D register responsive to said error signal, a V register means, means for establishing the value of V in said V register means, and means including said V register for dividing said pulse train having the frequency $f_o^*$ by the value in said V register to produce a feedrate pulse train having the frequency $f_o \cdot 1/D \cdot V$.

18. In a numerical control system as recited in claim 17 wherein said means responsive to the distance data stored in all said axis register means for establishing the value of D in said register means includes:

means for ordering the largest distance command, the next largest distance command and the smallest distance command, a calculating register, means for entering said next largest distance command into said calculating register, means for extracting one-half of the value of said next largest distance command from said calculating register, means for entering said one-half of the value of said largest distance into said D register, means for entering said largest distance command into said calculating register, means for extracting one-eighth of the value of said largest distance command from said calculating register, means for converting said one-eighth of the value of said largest distance command into a negative number, means for entering said negative number into said D register to be added to the number already there leaving a resultant difference, means for determining whether the resultant difference is less than zero in value, means for clearing said D register responsive to said resultant difference being less than zero, means for said smallest distance command into said calculating register, means for extracting one-fourth of the value of the smallest distance command from said calculating register, means for entering said one-fourth of the value of the smallest distance command into said D register to be added to the value therein, means for entering the largest distance command into said calculating register, and means for transferring the largest distance command from said calculating register to said D register to be added to the contents thereof whereby the value D is established in said D register.

19. In a numerical control system as recited in claim 17 wherein there is included means for normalizing the contents of said axis register including means for multiplying all of said distance commands by the value $2^n$ wherein $n$ is a value equal to the number of o's which exist between the most significant bit of the highest possible distance command expressed as a binary number which can be lifted into said axis register means and the most significant bit of the largest distance command expressed as a binary number.

20. In a numerical control system as recited in claim 17 wherein said axis register means, said D register means, said 1/D means and said V register means each comprises a digital differential integrator circuit.

21. Apparatus for generating a feedrate pulse train in response to number data expressed as a velocity number V representative of a desired velocity for operation of a machine tool and a vectorial distance D representative of a desired motion expressed as an X axis command number, a Y axis command number and a Z axis command number, said apparatus comprising:
an axis register means for each axis for storing each axis command number,
a source of oscillations at a frequency of $f_o$
a 1/D register means,
means responsive to the command numbers in said axis register means and including said 1/D register means and oscillations from said source for establishing a value in said 1/D register means having the value 1/D,
a V register means,
means for entering the value of the V number into said V register means,
means for applying the oscillations from said source to said 1/D register means to provide an output pulse train having a frequency $f_o \cdot 1/D$, and
means for applying the pulse train having a frequency $f_o \cdot 1/D$ to said V register means to produce a resulting feedrate pulse train having the frequency value $f_o \cdot V/D$.

22. A method for generating a feedrate pulse train for commanding a numerically controlled machine tool along a vectorial path D from motion command information expressed as a motion command number for each of a plurality of axes, and from a desired velocity for said machine tool expressed as a velocity number V, said method comprising the steps of calculating the value of D from the axis motion command numbers, determining the value 1/D from the calculated value of D, generating a pulse train having a frequency $f_o$ multiplying the frequency of the generated pulse train by the value 1/D to establish a second pulse train having a value $f_o \cdot 1/D$, and multiplying the frequency of the second pulse train by the velocity number to provide a feedrate pulse train having a frequency proportional to $f_o \cdot 1/D \cdot V$.

23. A method as recited in claim 22 wherein said step of calculating the value of D from the axis motion command numbers includes the step of multiplying the value of each of the motion command numbers by a number $2^n$ where $n$ is a value equal to the number of 0's between the most significant bit of the largest of the actually existing axis motion command numbers expressed as a binary number and the most significant bit of the largest possible axis motion command number expressed as a binary number.

* * * * *

UNITED STATES PATENT OFFICE
CERTIFICATE OF CORRECTION

Patent No. 3,617,718　　　　　　　　　Dated November 2, 1971

Inventor(s) Ernst H. Dummermuth

It is certified that error appears in the above-identified patent and that said Letters Patent are hereby corrected as shown below:

Column 3, Lines 24 and 25　　"$f_{out}=f_o \cdot (1 \cdot 2^{11}+1 \cdot 2^{12}+0 \cdot 2^{13}+1 \cdot 2^{14}+...) = f_o\ 0.8/25$" should read --$f_{out}=f_o \cdot (1 \cdot 2^{-1} + 1 \cdot 2^{-2}+0 \cdot 2^{-3}+1 \cdot 2^{-4}+...) = f_o \cdot 0.8125$--

Column 3, Line 69　　"$f_o \cdot 2^{17}$" should read --$f_o \cdot 2^{-7}$--

Column 3, Line 71　　"$2^{17}$" should read --$2^{-7}$--

Column 3, Line 72　　"$2^{126}$" should read --$2^{-26}$--

Column 4, Line 33　　"0'0'" should read --0's--

Column 5, Line 7　　Before "4" insert --÷--

Column 5, Line 24　　Before "4" insert --÷--

Column 5, Line 33　　Before "4" insert --÷--

Column 5, Line 52　　Before "4" insert --÷--

Column 5, Line 74　　Before "4" insert --÷--

Column 6, Line 8　　Before "4" insert --÷--

Column 6, Line 14　　Before "4" insert --÷--

Column 6, Line 18　　"Q" should read --$\bar{Q}$--

Column 6, Line 43　　Before "5" insert --÷--

Column 6, Line 44　　Before "6" insert --÷--

PO-1050
(5/69)

UNITED STATES PATENT OFFICE
CERTIFICATE OF CORRECTION - PAGE TWO

Patent No. 3,617,718     Dated November 2, 1971

Inventor(s) Ernst H. Dummermuth

It is certified that error appears in the above-identified patent and that said Letters Patent are hereby corrected as shown below:

Column 6, Line 45    Before "30", "5" and "6" insert --$\div$--

Column 6, Line 49    Before "5" and "6" insert --$\div$--

Column 6, Line 51    Before "5" and "6" insert --$\div$--

Column 8, Line 22    "$\overline{X^2+Y^2+Z^2}$" should read --$\sqrt{X^2+Y^2+Z^2}$--

Column 8, Line 59    "D" should read --K--

Column 9, Line 72    "Q" should read --$\overline{Q}$--

Column 12, Line 19   After "retained" insert a --period(.)--

Column 13, Line 73   "DD's" should read --DDI's--

Column 15, Line 43   "329" should read --328--

Column 16, Line 27   "in" should read --is--

Column 20, Line 27   After "$f_o$" insert a --comma(,)--

Column 20, Line 30   "$f_o \cdot 1/D.$" should read --$f_o \cdot 1/D,$--

Column 20, Line 36   "$f_o \cdot V/$" should read --$f_o \cdot V/D$--

Column 20, Line 45   "/D" should read --1/D--

Column 21, Line 2    "$f_o \cdot 1/D \cdot /D,D$" should read --$f_o \cdot 1/D \cdot D$--

Column 21, Line 60   "on" should read --in--

Column 22, Line 6    After "$f_o$" insert a --comma(,)--

PO-1050
(5/69)

UNITED STATES PATENT OFFICE
CERTIFICATE OF CORRECTION - PAGE THREE

Patent No. 3,617,718  Dated  November 2, 1971

Inventor(s)  Ernst H. Dummermuth

It is certified that error appears in the above-identified patent and that said Letters Patent are hereby corrected as shown below:

Column 22, Line 10   "foe" should read --for--

Column 22, Line 16   After "multiplying" insert --the--

Column 22, Line 19   After "$f_o^* \cong f_o$" insert a --comma(,)--

Column 22, Line 35   After "all" insert --of--

Column 23, Line 22   After "$f_o$" insert --comma(,)--

Column 24, Line 7    "for" should read --of--

Column 24, Line 17   "$f_o^1 1/D$" should read --$f_o \cdot 1/D$--

In The Drawings

In Figure 7, reference numeral 78 which is applied to the flip-flop adjacent to whose output the letters T4-T27 are placed should be changed to --76--. The reference numeral 80 applied to the flip-flop adjacent to whose outputs are the T1, T2 and T3, should be changed to --81--. The connection between flip-flop 77D and the flip-flop whose reference numeral has been changed from "80" to "81" should be eliminated.

Figure 6, the connection between the Q and $\overline{Q}$ output of flip-flop 54 should be eliminated. Figure 13, the flip-flop immediately below flip-flop 138 should have the reference numeral "140" applied to it. The NAND gate immediately below "NAND gate 152" should have reference numeral "154" applied to it. The designation "$\overline{5T}$" should be applied at the end of the lowermost line in the drawing (the one below 6T3). The three NAND gates which presently do not have reference numerals applied thereto

PO-1050
(5/69)

UNITED STATES PATENT OFFICE
CERTIFICATE OF CORRECTION - Page FOUR

Patent No. 3,617,718      Dated November 2, 1971

Inventor(s) Ernst H. Dummermuth

It is certified that error appears in the above-identified patent and that said Letters Patent are hereby corrected as shown below:

whose inputs are applied to NAND gates 166, 168 and 170, should have the respective reference numerals "164, 158 and 160" applied thereto.

Figure 15, flip-flop 283 the designation 5T2 applied to its bottom should be changed to "$\overline{T2}$".

Figure 16, the reference numeral 334 should be applied to the rectangle labeled "sorting by magnitude and fractional divider".

Signed and sealed this 20th day of February 1973.

(SEAL)
Attest:

EDWARD M. FLETCHER, JR.
Attesting Officer

ROBERT GOTTSCHALK
Commissioner of Patents